US011040323B2

(12) United States Patent
Talapin et al.

(10) Patent No.: US 11,040,323 B2
(45) Date of Patent: Jun. 22, 2021

(54) COLLOIDS OF INORGANIC NANOCRYSTALS IN MOLTEN MEDIA AND RELATED METHODS

(71) Applicant: The University of Chicago, Chicago, IL (US)

(72) Inventors: Dmitri V. Talapin, Riverside, IL (US); Hao Zhang, Urbana, IL (US); Vishwas Srivastava, Chicago, IL (US)

(73) Assignee: The University of Chicago, Chicago, IL (US)

( * ) Notice: Subject to any disclaimer, the term of this patent is extended or adjusted under 35 U.S.C. 154(b) by 180 days.

(21) Appl. No.: 15/772,950

(22) PCT Filed: Nov. 4, 2016

(86) PCT No.: PCT/US2016/060484
§ 371 (c)(1),
(2) Date: May 2, 2018

(87) PCT Pub. No.: WO2017/105662
PCT Pub. Date: Jun. 22, 2017

(65) Prior Publication Data
US 2018/0318784 A1 Nov. 8, 2018

Related U.S. Application Data

(60) Provisional application No. 62/251,867, filed on Nov. 6, 2015.

(51) Int. Cl.
*B01J 13/00* (2006.01)
*B01J 13/06* (2006.01)
*B82Y 30/00* (2011.01)

(52) U.S. Cl.
CPC ....... *B01J 13/0047* (2013.01); *B01J 13/0004* (2013.01); *B01J 13/0043* (2013.01); *B01J 13/06* (2013.01); *B82Y 30/00* (2013.01)

(58) Field of Classification Search
None
See application file for complete search history.

(56) References Cited

U.S. PATENT DOCUMENTS

| | | | |
|---|---|---|---|
| 5,198,189 A | 3/1993 | Booth et al. | |
| 7,927,516 B2 | 4/2011 | Strouse et al. | |
| 2003/0091647 A1 | 5/2003 | Lewis et al. | |
| 2006/0110279 A1 | 5/2006 | Han et al. | |
| 2008/0209876 A1* | 9/2008 | Miller | H01M 10/052 55/522 |
| 2008/0271570 A1* | 11/2008 | Vieth | B22F 9/12 75/345 |
| 2010/0025706 A1 | 2/2010 | Popovici et al. | |
| 2011/0144061 A1 | 6/2011 | Kato et al. | |
| 2013/0221289 A1* | 8/2013 | Arce Arce | C01B 9/06 252/519.3 |
| 2014/0084205 A1 | 3/2014 | Singh et al. | |
| 2014/0102884 A1 | 4/2014 | Miller | |
| 2014/0227548 A1 | 8/2014 | Myrick | |
| 2015/0376487 A1* | 12/2015 | Zeng | C09K 5/12 252/71 |
| 2017/0166807 A1* | 6/2017 | Kuzumoto | C09K 11/025 |
| 2017/0349824 A1 | 12/2017 | Kan | |
| 2018/0200293 A1* | 7/2018 | Ghandi | B01J 35/0013 |
| 2019/0389738 A1 | 12/2019 | Talapin | |

OTHER PUBLICATIONS

"A Remarkable Anion Effect on Palladium Nanoparticle Formation and Stabilization in Hydroxyl-functionalized Ionic Liquids" authored by Yuan et al., and published in Physical Chemistry Chemical Physics (2012) 14, 6026-6033.*
"Synthesis and Characterization of Single-Crystalline Lanthanum Fluoride with a Ring-like Nanostructure" authored by Tian et al. and published in the European Journal of Inorganic Chemistry (2009) 2383-2387.*
"Metal Nanoparticle Synthesis in Ionic Liquids" authored by Janiak and published in Topics in Organometallic Chemistry (2015) 51, 17-54.*
Langmuir (2009) 25 (2), 2604-12.*
Topics in Current Chemistry (2017) 375(5), 78-120.*
Materials Research Society Symposium Proceedings (2012) 1473, DOI 10.1557/opl.2012.1211.*
Gerbec et al., "Microwave-Enhanced Reaction Rates for Nanoparticle Synthesis," J. Am. Chem. Soc., vol. 127, 2005, pp. 15791-15800.
Kornienko et al., "Solution Phase Synthesis of Indium Gallium Phosphide Alloy Nanowires," J. Am. Chem. Soc., vol. 9, No. 4, 2015, pp. 3951-3960.
Moon et al., "Formation of water soluble wavelength tunable InGaP and InP quantum dots," Polym. Bull., vol. 73, 2016, pp. 2463-2475.
Bronstein et al., "Morphological Control of InxGal-xP Nanocrystals Synthesized in a Nonthermal Plasma," Chem. Mater., DOI: 10.1021/acs.chemmater.8b01358 • Publication Date (Web): Apr. 9, 2018, pp. 1-25.
Pietra et al., "Ga for Zn Cation Exchange Allows for Highly Luminescent and Photostable InZnP-Based Quantum Dots," Chem. Mater., vol. 29, 2017, pp. 5192-5199.
Pietra et al., Supporting Information—"Ga for Zn Cation Exchange Allows for Highly Luminescent and Photostable InZnP-Based Quantum Dots," Chem. Mater., vol. 29, 2017, pp. 1-8.
Trizio et al., "Forging Colloidal Nanostructures via Cation Exchange Reactions," Chem. Rev., vol. 116, 2016, pp. 10852-10887.
Beberwyck et al., "Ion Exchange Synthesis of III—V Nanocrystals," J. Am. Chem. Soc., vol. 134, 2012, pp. 19977-19980.
Beberwyck et al., Supporting Information—"Ion Exchange Synthesis of III—V Nanocrystals," J. Am. Chem. Soc., vol. 134, 2012, pp. 1-6.

(Continued)

*Primary Examiner* — Marc S Zimmer
(74) *Attorney, Agent, or Firm* — Bell & Manning, LLC

(57) ABSTRACT

Colloids comprising inorganic nanocrystals dispersed in a molten salt or a liquid metal are provided. The molten salt may comprise an ion which is a Lewis acid or a Lewis base in the presence of the inorganic nanocrystals. Solid composites formed from the colloids are also provided. Methods of using the colloids as media for inducing chemical transformations using the inorganic nanocrystals are also provided.

18 Claims, 18 Drawing Sheets

(56) References Cited

OTHER PUBLICATIONS

Son et al., "Cation Exchange Reactions in Ionic Nanocrystals," Science, vol. 306, Nov. 5, 2004, pp. 1009-1012.
Son et al., Supporting Online Information—"Cation Exchange Reactions in Ionic Nanocrystals," Science, vol. 306, Nov. 5, 2004, pp. 1-2.
Park et al., "Fabrication of GaAs, InxGa1—xAs and Their ZnSe Core/Shell Colloidal Quantum Dots," J. Am. Chem. Soc., vol. 138, 2016, 66. 16568-16571.
Park et al., Supporting Information—"Fabrication of GaAs, InxGa1—xAs and Their ZnSe Core/Shell Colloidal Quantum Dots," J. Am. Chem. Soc., vol. 138, 2016, 66. 1-6.
Kim et al., "Highly Luminescent InP/GaP/ZnS Nanocrystals and Their Application to White Light-Emitting Diodes," J. Am. Chem. Soc., vol. 134, 2012, pp. 3804-3809.
Kim et al., Supporting Information—"Highly Luminescent InP/GaP/ZnS Nanocrystals and Their Application to White Light-Emitting Diodes," J. Am. Chem. Soc., vol. 134, 2012, pp. 1-9.
Micic et al., "Synthesis and Characterization of InP, GaP, and GaInPi$_2$ Quantum Dots," J. Phys. Chem., vol. 99, 1995, pp. 7754-7759.
International Search Report and Written Opinion mailed in PCT/US2016/060484, dated Jul. 21, 2017.
L. Medina, Colloidal interactions in ionic liquids: Effect of surface area and particle type, (2011).
V. Somani, Colloidal stability of magnetic nanoparticles in molten salts, (2010).
M. Thoms, Adsorption at the Nanoparticle Interface for Increased Thermal Capacity in Solar Thermal Systems, Jun. 2012.
Ueno et al., Colloidal Stability of Bare and Polymer-Grafted Silica Nanoparticles in Ionic Liquids, Langmuir, vol. 24, Apr. 22, 2008, pp. 5253-5259.
Kohn et al., Metallic Colloids in Molten Salts, Science, vol. 163, Feb. 28, 1969, pp. 924-925.
Schrekker et al., Disclosure of the imidazolium cation coordination and stabilization mode in ionic liquid stabilized gold(0) nanoparticles, Journal of Colloid and Interface Science, vol. 316, Aug. 14, 2007, pp. 189-195.
Kovalenko et al., Inorganically Functionalized PbS-CdS Colloidal Nanocrystals: Integration into Amorphous Chalcogenide Glass and Luminescent Properties, J. Am. Chem. Soc., 134, Jan. 7, 2012, pp. 2457-2460.
Ott et al., Nanoclusters in Ionic Liquids: Evidence for N-Heterocyclic Carbene Formation from Imidazolium-Based Ionic Liquids Detected by 2H NMR, J. Am. Chem. Soc., 127, Apr. 5, 2005, pp. 5758-5759.
Ning et al., Quantum-dot-in-perovskite solids, Nature, 523, Jul. 16, 2015, pp. 324-328.
Llordes et al., Tunable near-infrared and visible-light transmittance in nanocrystal-in-glass composites, Nature, vol. 500, Aug. 15, 2013, pp. 323-327.
Josephine F. L. Lox et al., "Near-Infrared Cu-In-Se-Based Colloidal Nanocrystals via Cation Exchange," *Chem. Mater.* 2018, vol. 30, pp. 2607-2617.
Vishwas Srivastava et al., "Understanding and Curing Structural Defects in Colloidal GaAs Nanocrystals," Nano Lett. 2017, vol. 17, pp. 2094-2101.
Hao Zhang et al., "Stable colloids in molten inorganic salts," Nature, Feb. 16, 2017, vol. 542, pp. 1-16.

\* cited by examiner

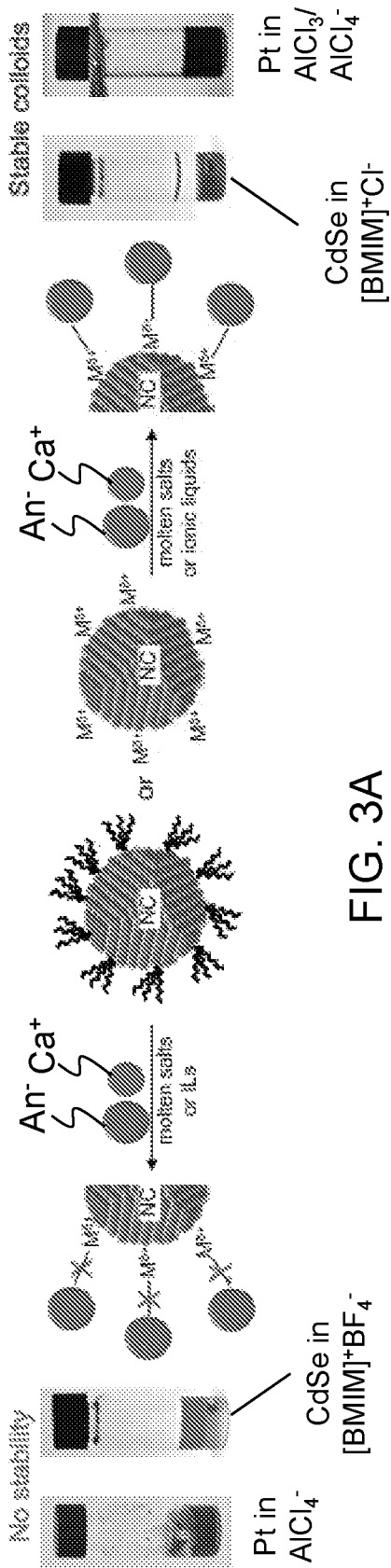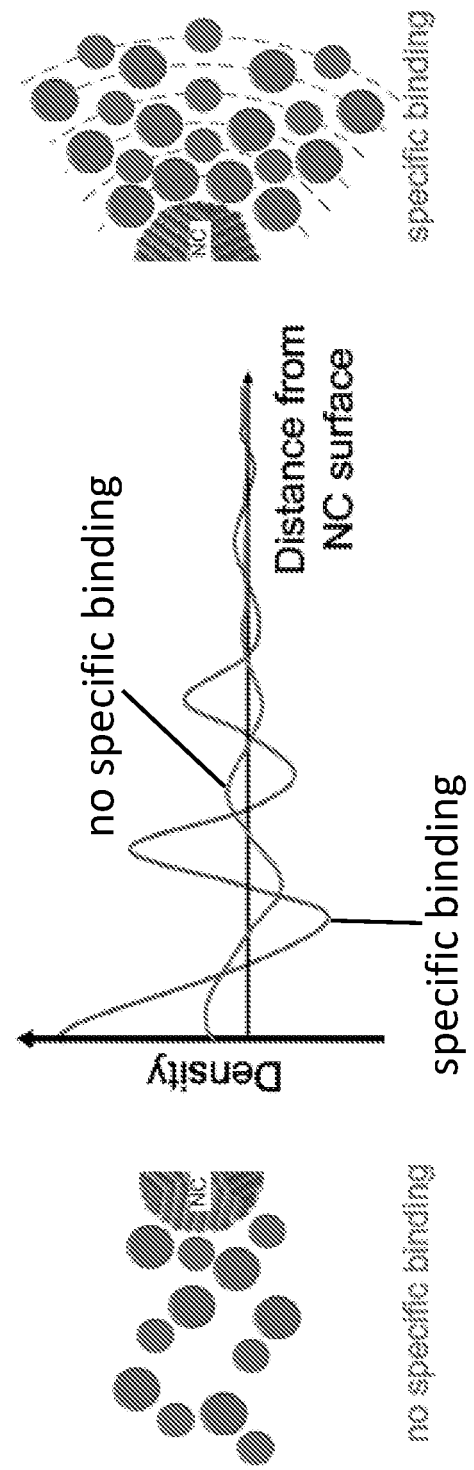
FIG. 3A
FIG. 3B

COLLOIDS OF INORGANIC NANOCRYSTALS IN MOLTEN MEDIA AND RELATED METHODS

CROSS-REFERENCE TO RELATED APPLICATIONS

The present application is a National Stage of International Application No. PCT/US2016/060484 that was filed Nov. 4, 2016, the entire contents of which are hereby incorporated by reference. Which claims priority to U.S. Provisional Patent Application No. 62/251,867 that was filed Nov. 6, 2015, the entire contents of which are hereby incorporated by reference.

REFERENCE TO GOVERNMENT RIGHTS

This invention was made with government support under DMR-1310398 and DMR 08-20054 awarded by the National Science Foundation and N00014-13-1-0490 awarded by the Department of Defense Office of Naval Research. The government has certain rights in the invention.

BACKGROUND

Two components of different chemical nature can be combined in the form of a micro- or nano-heterogeneous suspension where particles or droplets of one phase (further referred to as solute) are homogeneously distributed in the liquid phase (solvent). Such colloidal dispersions play an important role in many biological and technological processes. To stabilize a colloidal system against coalescence and aggregation, the solute surface is typically decorated with molecular species (surfactants) or charged with ions that impose repulsive force between solute particles. The repulsion can have electrostatic or steric nature. For example, particles with charged surface experience Coulomb repulsion over the distance determined by the Debye screening length of the solvent. Over longer distances, the surface charge is screened by oppositely-charged counter ions located in a diffuse region around each particle. The Derjaguin-Landau-Verwey-Overbeek (DLVO) theory describes the balance between attractive van der Waals force and electrostatic double-layer repulsion of charged particles. Good solvents for electrostatically stabilized particles are generally those with high dielectric constant, $\varepsilon$, such as water ($\varepsilon=80$), dimethylformamide ($\varepsilon=36.7$). In contrast, non-polar solvents such as hexane or toluene ($\varepsilon \sim 2$) cannot support charged particles. In solvents with low E, colloidal solutions can be achieved by steric stabilization using surfactants with long hydrocarbon chains. The surface-tethered chains interact with solvent with a negative free energy of chain-solvent mixing. It causes hydrocarbon chains to repel one another upon close approach of solute particles, stabilizing colloidal dispersions in non-polar solvents. In many cases, electrostatic and steric repulsion can be strong enough to overpower short-range van der Waals attraction and thus prevent irreversible aggregation of solute particles. Other contributions to inter-particle potentials typically play a secondary role in colloidal stabilization.

SUMMARY

Colloids comprising solid inorganic nanocrystals in a molten medium and composite materials made from solidifying the colloids are provided. The colloids comprise inorganic nanocrystals distributed in a molten inorganic salt, an ionic liquid, a liquid metal, or a molten glass.

In one aspect, colloids are provided. In embodiments, a colloid comprises inorganic nanocrystals dispersed in a molten salt or a liquid metal, wherein the molten salt comprises an ion which is a Lewis acid or a Lewis base in the presence of the inorganic nanocrystals. The molten salt may be a molten inorganic salt or an ionic liquid. Solid composites formed from colloids comprising inorganic nanocrystals dispersed in liquid metal are also provided. Objects comprising two metal surfaces and such solid composites between the two metal surfaces are also provided.

In another aspect, methods of using the colloids as media to induce chemical transformations using the inorganic nanocrystals are also provided. In embodiments, a method comprises heating a colloid comprising inorganic nanocrystals dispersed in a molten inorganic salt to a temperature and for a time sufficient to induce a chemical transformation using the inorganic nanocrystals. The chemical transformation may involve transforming the inorganic nanocrystals to core-shell inorganic nanocrystals, modifying the crystal structure of the inorganic nanocrystals, or modifying the chemical composition of the inorganic nanocrystals.

These aspects and other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings.

FIG. 3A shows a schematic drawing reflecting the relationship between colloidal stability of NCs in molten salts and the specific binding between NCs and solvents. FIG. 3B shows a schematic of solvent molecules (cation: small spheres/anion: large spheres) structuring close to the NC surface without (left) and with (right) specific binding between NCs and solvents, respectively. In the latter, more ordered structuring of cations/anions induced by the specific interactions is expected. The middle panel shows the density profiles of solvents close to NC surface corresponding to scenarios depicted in the left and right panels.

DETAILED DESCRIPTION

Figure 1A:
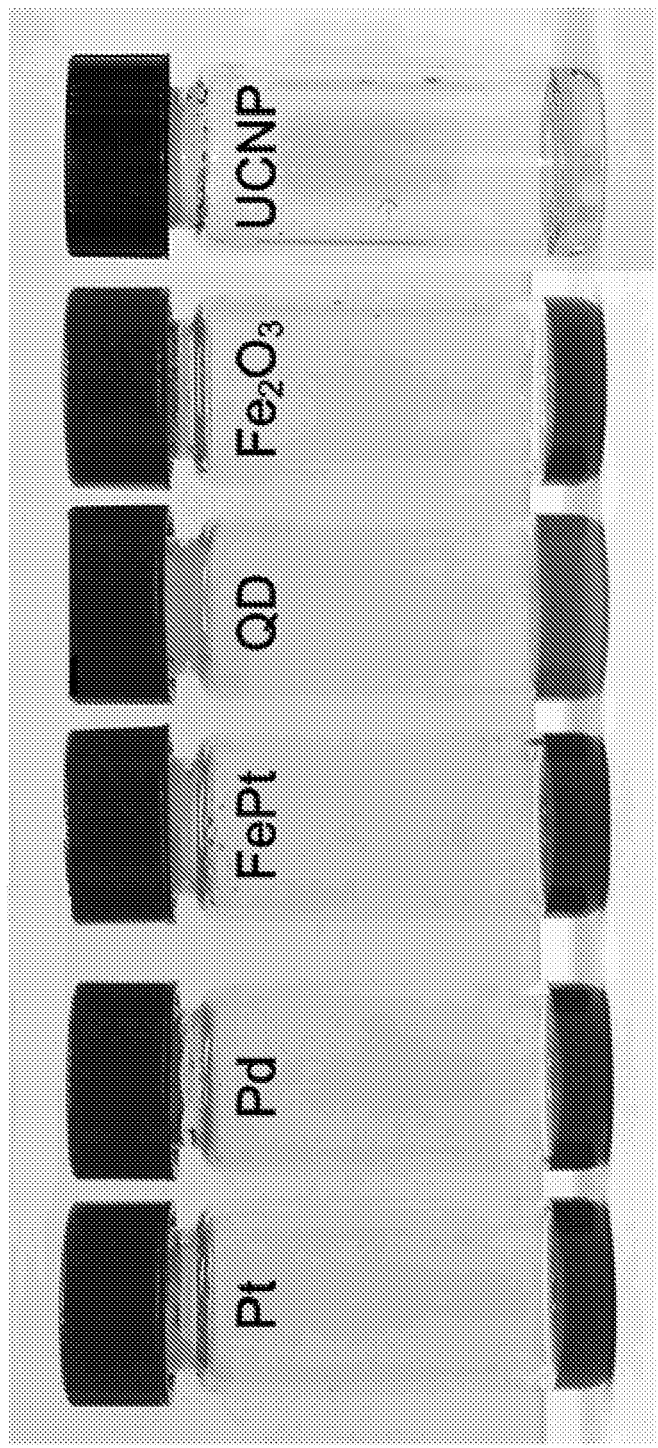
FIG. 1A shows images of various nanocrystal (NC) colloids in molten $AlCl_3/AlCl_4^-$.

Colloids comprising inorganic nanocrystals dispersed, preferably homogenously, in a molten medium comprising a molten inorganic salt, an ionic liquid, a liquid metal, or a molten glass are provided. Such molten media differ significantly from conventional solvents for inorganic nanocrystals (i.e., water or organic solvents), enabling a wider variety of applications for colloidal nanomaterials, e.g., from catalysis to soldering.

As used herein, the term "nanocrystals" refers to an inorganic particle having a largest cross-sectional dimension of no greater than 1000 nm. This includes particles having a largest cross-sectional dimension of no greater than 100 nm and further includes particles having a largest cross-sectional dimension of no greater than 10 nm. In embodiments, the largest cross-sectional dimension is in the range of about 1 nm to about 10 nm. When the nanocrystals are present as a plurality of nanocrystals, these dimensions refer to the average largest cross-sectional dimension for the collection of nanocrystals.

Nanocrystals that can be incorporated into the molten media to form colloids include metal nanocrystals, metal alloy nanocrystals, semiconductor nanocrystals, metal oxide nanocrystals, metalloid oxide nanocrystals, and combinations thereof. Specific examples include Pt nanocrystals, Pd nanocrystals, FePt nanocrystals, CdSe nanocrystals, InP nanocrystals, InAs nanocrystals, GaAs nanocrystals, CdSe/CdZnS core-shell nanocrystals, InP/GaP core-shell nanocrystals, InP/ZnS core-shell nanocrystals, iron oxide (e.g., Fe$_2$O$_3$) nanocrystals, alpha-NaYF$_4$:Yb, Er@CaF$_2$ nanocrystals, SiO$_2$ nanocrystals, and combinations thereof.

As noted above, the molten media from which the present colloids are composed is a molten inorganic salt, an ionic liquid, a liquid metal or a molten glass. In some instances in the present disclosure, the terms "molten" and "liquid" are used interchangeably. In other instances, "molten" is used with reference to materials which have a melting point (T$_m$) greater than room temperature (i.e., about 20° C. to 25° C.) and which are at a temperature higher than their melting point such that they are in a liquid state. In other instances, "liquid" may be used with reference to materials which are liquids at about room temperature (e.g., about 20° C. to 25° C.). In the present disclosure, the term "molten salt" refers to molten inorganic salts and ionic liquids. The term "ionic liquid" refers to molten salts having at least one organic substituent/ion and a melting point below 100° C. "Ionic liquids" may be referred to as "room temperature ionic liquids." The term "molten inorganic salt" is used to refer to molten salts which contain only inorganic substituents/ions.

A variety of molten inorganic salts may be used to form the colloids. The molten inorganic salt may be a mixture (e.g., a eutectic mixture) of different inorganic salts. The selected molten inorganic salt may be one which exhibits sufficient binding affinity to the selected nanocrystals so as to form a homogeneous, uniform dispersion of the nanocrystals throughout the molten inorganic salt. At least in some cases, this binding affinity may be sufficient to achieve the homogeneous, uniform dispersion even in the absence of any organic capping ligands associated with the nanocrystals. The phrase "binding affinity" can refer to the formation of covalent bonds or non-covalent (e.g., hydrogen bonds) between the molten inorganic salt (or a component thereof) and the nanocrystals. The phrase can also refer to the formation of an adduct of the nanocrystals and a molten inorganic salt (or component thereof) which exhibits Lewis acid (or base) activity in the presence of the selected nanocrystals. Thus, in embodiments, the selected molten inorganic salt comprises a component which is a Lewis acid or a Lewis base in the presence of the selected nanocrystals. Salt additives may be included in the molten inorganic salt at an amount sufficient to provide the desired binding affinity, e.g., Lewis acid/base activity. By way of illustration, the salt AlCl$_3$ or AlBr$_3$ may be added to a molten inorganic salt or mixture to provide Lewis acid/base activity.

In embodiments, the molten inorganic salt is characterized by a melting point (T$_m$) of below 350° C. This includes embodiments in which the molten inorganic salt has a T$_m$ in the range of from about 50° C. to less than 350° C.

Suitable molten inorganic salts include metal halides, such as mixed metal halides, and thiocyanate salts. Specific examples of metal halides include AlBr$_3$ and GaI$_3$. Specific examples of mixed metal halides include: NaCl—KCl—AlCl$_3$ mixtures; CsBr—LiBr—KBr mixtures; LiCl—LiBr—KBr mixtures; LiCl—LiI—KI mixtures; ZnCl$_2$—NaCl—KCl mixtures; and NaSCN—KSCN mixtures. Binary and ternary mixtures containing components selected from GaX$_3$ and AX may be used, wherein X is selected from Cl, Br and I and A is selected from Li, Na, K and Cs. A suitable binary mixture includes a GaBr$_3$—CsBr mixture (T$_m$~95° C.). Other examples are listed in Table 1, below. In embodiments, the molten inorganic salt is not a nitrate salt or a nitrite salt and/or does not include a nitrate salt or a nitrite salt.

A variety of ionic liquids may be used to form the colloids. Similar to the molten inorganic salts, the ionic liquid may be a mixture of different ionic liquids. The selected ionic liquid may be one which exhibits sufficient binding affinity to the selected nanocrystals so as to form a homogeneous, uniform dispersion of the nanocrystals throughout the ionic liquid. At least in some cases, this binding affinity may be sufficient to achieve the homogeneous, uniform dispersion even in the absence of any organic capping ligands associated with the nanocrystals. The phrase "binding affinity" has the same meaning as described above with respect to molten inorganic salts. Thus, in embodiments, the selected ionic liquid comprises a component which is a Lewis acid or a Lewis base in the presence of the selected nanocrystals. Similar to the molten inorganic salts, salt additives may be included in the ionic liquid at an amount sufficient to provide the desired binding affinity, e.g., Lewis acid/base activity. By way of illustration, an ionic liquid comprising a halide anion, e.g., $Cl^-$ or $I^-$, may be added to another ionic liquid to provide Lewis acid/base activity.

Suitable ionic liquids include 1-buty-3-methylimidazolium ([BMIM]) halides and 1-ethyl-3-methylimidazolium ([EMIM]) halides. Specific examples include $[BMIM]^+Cl^-$ and $[BMIM]^+I^-$. Another suitable ionic liquid is $[BMIM]^+SCN^-$. Other examples are listed in Table 2, below.

A variety of liquid metals may be used in the colloids. Suitable liquid metals include pure liquid metals, liquid metal alloys, and eutectic mixtures. Specific examples of these include Woods metal, Ga—In eutectics, and Sn—Pb eutectics.

A variety of molten glasses may be used in the colloids. The molten glasses may be metal silicates containing a Si—O framework and which exhibit an amorphous structure in both the liquid state and the solid state. In embodiments, the molten glass is a composition which has a melting point of less than about 700° C. or less than about 600° C. A suitable molten glass includes Pb and Zn silicates, an inorganic filler such as barium silicate, and an organic solvent such as texanol. Such a molten glass may be commercially available under the name FX11-036 Sealing Glass from Ferro Corporation.

As described above, the present colloids may be characterized as having a homogeneous and uniform dispersion of the nanocrystals throughout the continuous phase (i.e., the molten salt, liquid metal or molten glass). Although the nanocrystals may be formed with organic capping ligands bound to their surfaces, in embodiments, these organic capping ligands may be displaced with components (e.g., ions) from the molten media (e.g., molten salts) while still providing a stable dispersion. Generally, if the molten media (or component thereof) has sufficiently strong binding affinities for the nanocrystals, the organic capping ligands on the nanocrystals can be partially, completely, or substantially completely displaced by the molten media. In other embodiments, the colloids are formed using bare nanocrystals, e.g., from ligand-stripped nanocrystals.

Due to the replacement of organic capping ligands or use of bare nanocrystals, in embodiments, the present colloids may be characterized as being substantially free of organic capping ligands. By "substantially free" it is meant that the colloid is completely free of such ligands or such ligands are present in such a small amount so as to have no material effect on the colloid. Similarly, in embodiments, the colloids may be characterized as being substantially free of any capping ligands (e.g., inorganic capping ligands) other than those provided by the components of the molten medium itself. In embodiments, the colloid consists or consists essentially of the nanocrystals and the molten medium (i.e., the molten salt, the liquid metal or the molten glass), and optionally, one or more salt additives.

The present colloids may be characterized by the amount of nanocrystals contained therein. In embodiments, the colloid includes no more than about 10 weight % of the nanocrystals. This includes embodiments in which the amount of nanocrystals is no more than about 2 weight %, in the range of from about 0.1 weight % to 10 weight %, or in the range of from about 0.1 weight % to about 2 weight %.

The colloids may be characterized by their stability as evidenced by the maintenance of a homogeneous and uniform distribution of nanocrystals throughout the molten medium over a period of time. Colloidal stability may be measured visually (e.g., photographs), by using transmission electron microscope (TEM) images, or through Small Angle X-ray Scattering (SAXS) data (see FIG. 2D), as described in Example 1 below. In embodiments, the colloids are stable under an inert atmosphere for at least a month. This includes embodiments in which the colloids are stable under an inert atmosphere for at least 2, 4, 6, 8, 12 etc. months. For even longer storage, composites may be formed by solidifying the colloids as described below. Such composites may be reheated to the molten state, thereby reforming a colloid characterized by a homogeneous and uniform distribution of nanocrystals throughout the molten medium.

The present colloids can be made by interfacing the molten medium (e.g., molten inorganic salt) with nanocrystals stabilized by organic capping ligands dispersed in an organic solvent and stirring, whereby the nanocrystals undergo phase transfer from the organic solvent to the molten medium. Alternatively, the colloids can be made by mixing the nanocrystals in a non-polar solvent with the molten medium (e.g., molten inorganic salt) or through a "solvent-free" method (defined in Example 1 below). Details of these methods (e.g., illustrative solvents, conditions, etc.) and other methods are described in Example 1, below.

Also provided are solidified composites formed by solidifying any of the present colloids to form a composite comprising nanocrystals dispersed in a solid matrix. The composite may be formed by cooling the colloid below the melting point of the molten medium. As with the colloids from which the composites are formed, the nanocrystals may be homogeneously and uniformly dispersed throughout the solid matrix. Similarly, the chemical composition of the composites follows that described above for the colloids.

The colloids and the solid composites made therefrom have applications in batteries, photovoltaic cells, catalysis, optical and optoelectronic devices, functional windows, metallurgy, soldering, three-dimensional printing, and lubricants. By way of illustration, the colloids may be used as inks and printed on a substrate using a printer (see FIG. 5). The colloids may be used as solders to join less fusible metals (see FIG. 4A). The colloids may be used as heat transfer fluids in nuclear and solar technologies.

Another application for the present colloids is as media for conducting chemical transformations. Since the colloids are formed from molten media, chemical transformations requiring high temperatures, e.g., greater than about 300° C., may be conducted using the colloids. This includes embodiments in which the temperatures used to induce the chemical transformations are greater than about 400° C., greater than about 600° C., greater than about 800° C. or about 1000° C. These temperatures are generally much higher than is possible using conventional colloidal chemistry. The phrase "chemical transformation" refers to any type of change the inorganic nanocrystals of the colloid may undergo in order to transform them from their initial state in the colloid to some desired, final state. By way of illustration, this change may be a change in crystal structure, a change in morphology, a change in chemical composition, or combinations thereof. The phrase "chemical transformation" also refers to transformations (e.g., chemical reactions) which make use of the inorganic nanocrystals (e.g., as catalysts) to induce these types of changes in other reactants added to the colloids. Thus, in embodiments, a method comprises heating a colloid comprising inorganic nanocrystals dispersed in a molten inorganic salt to a temperature and for a time sufficient to induce a chemical transformation of the inorganic nanocrystals or sufficient to induce a chemical transformation of reactants in the colloid catalyzed by the inorganic nanocrystals.

In embodiments, the present colloids are used as media for forming core-shell nanocrystals. In such embodiments, the chemical transformation involves forming a shell over the inorganic nanocrystals of the colloid. Growth of a thin wide band gap semiconductor shell over nanocrystal cores is a strategy used to improve the optical properties of semiconductor quantum dots. However, shell growth can be challenging. Efficient shell growth methods typically require highly air free conditions and high temperature so as to avoid incorporating structural defects at the core-shell interface, which can negatively affect emission properties. Shell growth can be particularly challenging in the case of group III-V semiconductors which are prone to the formation of oxides. In embodiments, the present colloids offer a different approach to shell growth.

In embodiments, a method for forming core-shell nanocrystals comprises adding a shell precursor to any of the present colloids at a temperature and time sufficient to form a shell over the inorganic nanocrystals of the colloid. The molten media of the colloid may be any of the disclosed molten salts, e.g., any of the disclosed molten inorganic salts. The molten salt may be selected to provide a first component of the desired shell, while the shell precursor provides a second component of the desired shell. The inorganic nanocrystals of the colloid may be semiconductor nanocrystals, e.g., group III-V semiconductors. The shell may be composed of a semiconductor, e.g., a different group III-V semiconductor or a group II-VI semiconductor. Example 2 below provides illustrative semiconductor nanocrystals, molten inorganic salts, shell precursors, temperatures and times for forming core-shell inorganic nanocrystals.

In embodiments, the present colloids are used as media for inducing modifications to the crystal structure of the inorganic nanocrystals in the colloids. Some semiconductor nanocrystals, e.g., GaAs, cannot be synthesized at temperatures that are suitable for conventional colloidal chemistry. Thus, solid state approaches to semiconductor nanocrystal synthesis involve metal-organic chemical vapor deposition (MOCVD) or molecular beam epitaxy (MBE) to yield uniform and defect-free semiconductor nanocrystals. These techniques involve high temperatures and reducing environments. In embodiments, the present colloids offer a different approach to formation of defect-free semiconductor nanocrystals.

In some such embodiments, a method comprises exposing any of the present colloids to a temperature and for a time sufficient to induce modifications of the crystal structure of the inorganic nanocrystals in the colloids. The molten media of the colloid may be any of the disclosed molten salts, e.g., any of the disclosed molten inorganic salts. The inorganic nanocrystals of the colloid may be semiconductor nanocrystals, e.g., group III-V semiconductors. The temperature and time may be that which is sufficient to remove, completely remove, or substantially completely remove defects (e.g., crystal defects) in the as-synthesized inorganic nanocrystals. The temperature and time may be that which is sufficient to prevent, completely prevent, or substantially completely prevent sintering of the inorganic nanocrystals. The temperature and time may be that which is sufficient to prevent, completely prevent, or substantially completely prevent morphological changes of the inorganic nanocrystals. In each instance, the term "substantially" has a meaning analogous to "substantially free" as described above. Example 3 below provides illustrative semiconductor nanocrystals, molten inorganic salts, temperatures and times for inducing crystal structure modifications. As further described in Example 3, the colloids may include salt additives to aid the alleviation of crystal defects. Such salt additives may share an ionic component in common with the inorganic nanocrystals (e.g., the salt additive $GaI_3$ may be used with GaAs inorganic nanocrystals, where Ga is the shared ionic component).

In embodiments, the present colloids are used as media for inducing changes in the chemical composition of the inorganic nanocrystals in the colloids, e.g., via ion exchange. In some such embodiments, a method comprises adding an ion exchange additive to any of the present colloids at a temperature and for a time sufficient to exchange ions of the ion exchange additive with ions of the inorganic nanocrystals, thereby changing the chemical composition of the nanocrystals. The molten media of the colloid may be any of the disclosed molten salts, e.g., any of the disclosed molten inorganic salts. The inorganic nanocrystals of the colloid may be semiconductor nanocrystals, e.g., group III-V semiconductors. The ion exchange additive may be selected such that it includes the desired ions (e.g., cations or anions) to be exchanged with the desired ions of the nanocrystals. For example, the ion exchange additive may include a group III element or a group V element. The temperature and time may be selected such that the exchange is partial, complete or substantially complete. The term "substantially" has a meaning analogous to "substantially free" as described above. Example 4 below provides illustrative semiconductor nanocrystals, molten inorganic salts, ion exchange additives, temperatures and times for inducing changes in the chemical composition of inorganic nanocrystals.

EXAMPLES

Example 1

In this Example approaches to form the colloids of nanoscale, inorganic solutes in very unusual solvents such as molten inorganic salts and liquid metals are investigated. These media are widely used in solid-(molten) state chemistry and metallurgy, as heat transfer fluids in nuclear and solar technologies, and many other technologically important areas. Demonstration of stable colloidal systems in such media opens up opportunities to design unprecedented composites using a rich toolbox of techniques from colloidal chemistry.

As solutes sub-10 nm nanocrystals (NCs) of various metals and semiconductors were used. The NCs with different size, shape and composition were first synthesized in organic solvents using organic surfactants (n-alkyl carboxylic acids, alkylamines and alkylthiols) for steric stabilization of the colloidal state in non-polar solvents (see Supplementary Information for additional details). Such organic ligands are naturally incompatible with molten inorganic salts or liquid metals and cannot provide colloidal stabilization in these media. Surfactant-free (or "bare") NCs may be obtained by using ligand stripping agents such as nitrosonium tetrafluoroborate (NOBF$_4$) (Dong, A. et al. *J. Am. Soc. Chem.* 133, 998-1006 (2011); Nag, A. et al. *J. Am. Soc. Chem.* 133, 10612-10620 (2011); Rosen, E. L. et al. *Angew. Chem. Int. Ed.* 51, 684-689 (2012)).

Surface engineering plays a crucial role in the dispersion of NCs in unusual solvents. First, the behavior of different NCs in various inorganic molten salts was studied. Salts with melting temperature (T$_m$) below 350° C. were examined. As shown in Table 1, below, there are many formulations of mixed metal halides, nitrates and thiocyanates which fulfill this requirement.

TABLE 1

A list of (eutectic) molten salts used in Example 1.[a]

| Formula (mol. %)[b] | Abbreviation | T$_m$ (° C.) |
|---|---|---|
| AlCl$_3$:NaCl:KCl = 63.5:20:16.5 | AlCl$_3$/AlCl$_4^{-c}$ | ~90 |
| LiAlBr$_4$:NaAlCl$_4$:KAlCl$_4$ = 30:50:20 | AlCl$_4^-$/AlBr$_4^-$ | 86 |
| NaAlCl$_4$:KAlCl$_4$ = 70:30 | AlCl$_4^-$ | 129 |
| AlBr$_3$ | AlBr$_3$ | 97.8 |
| LiCl:LiBr:KBr = 25:37:38 | Cl$^-$/Br$^-$ | 320 |
| LiCl:LiI:KI = 2.6:57.3:40.1 | Cl$^-$/I$^-$ | 270 |
| CsBr:LiBr:KBr = 25:56.1:18.9 | Br$^-$ | 230 |
| ZnCl$_2$:NaCl:KCl = 60:20:20 | ZnCl$_2$/ZnCl$_4^{2-}$ | 203 |
| KSCN:NaSCN = 73.7:26.3 | SCN$^-$ | 130-140 |
| 6% NaNO$_3$, 23% KNO$_3$, 8% LiNO$_3$, 19% Ca(NO$_3$)$_2$, 44% CsNO$_3$ (wt. %) | NO$_3^-$ | 65 |
| 14.2% NaNO$_3$, 50.5% KNO$_3$, 17.5% LiNO$_3$, 17.8% NaNO$_2$ (wt. %) | NO$_3^-$/NO$_2^-$ | 100 |

[a]The melting points (T$_m$) of (eutectic) molten salts may slightly vary from different literatures/databases.
[b]The formula of nitrate and nitrate/nitrite molten salts are based on a weight percentage (wt. %).
[c]This molten salt contains mainly AlCl$_4^-$ and Al$_2$Cl$_7^-$ with Na$^+$ and K$^+$, and minor species like Al$_2$Cl$_6$ and AlCl$_3$.

For example, a mixture containing NaCl, KCl and AlCl$_3$ with a molar ratio AlCl$_3$:NaClKCl=0.635:0.2:0.165 (further referred to as AlCl$_3$/AlCl$_4^-$) has a T$_m$~90° C. Low T$_m$ allows interfacing the molten salt with colloidal solutions of various NCs. As further described in the supplemental section below, the NCs stabilized with native organic ligands and dispersed in n-decane (boiling point, T$_b$=174° C.) were interfaced with the molten salt with stirring. Rather counterintuitively, the transfer of NCs from non-polar n-decane phase to the molten salt was observed, with the formation of stable colloidal solutions. The organic phase can be removed and NCs in molten salt can be handled as ordinary colloidal solutions. Stable NC dispersions can also be achieved by simply mixing a drop of NCs in non-polar solvents with AlCl$_3$/AlCl$_4^-$ or through a "solvent-free" method, described in the supplemental section, below. Using similar approaches, colloidal solutions of different metal (Pt, Pd), semiconductor quantum dot (CdSe/CdZnS core/shell NCs, further referred to as QD), oxide (Fe$_2$O$_3$) and upconverting NCs (NaYF$_4$: Yb, Er@CaF$_2$, further referred to as UCNP) were prepared. Similarly, colloidal solutions in other molten salts, including CsBr—LiBr—KBr (T$_m$=230° C.), LiCl—LiBr—KBr (T$_m$=320° C.), LiCl—LiI—KI (T$_m$=270° C.), AlBr$_3$ (T$_m$=98° C.), ZnCl$_2$—NaCl—KCl (203° C.) and NaSCN—KSCN (T$_m$~130-140° C.) were prepared. In most cases, the cleavage of native organic ligands facilitates the dispersion of bare NCs in molten salts. Photographs of the colloidal solutions were obtained, confirming the homogenous dispersion of the NCs throughout the molten inorganic media. By way of illustration, FIG. 1A shows various NC colloids in molten AlCl$_3$/AlCl$_4^-$. As shown in Table 2, these results show an impressive versatility of NC colloids in various molten salts.

TABLE 2

Experimentally tested combinations of NCs and molten salts forming homogeneous colloids.

| Molten salt or ILs (Abbreviation) | Nanocrystals (NCs) |
|---|---|
| AlCl$_3$/AlCl$_4^-$ | Pt, FePt, Pd, QD, UCNP with organic surfactants; bare Pt, FePt, Pd, QD, UCNP, Fe$_2$O$_3$ NCs; Pd with Sn$_2$S$_6^{4-}$; QD with Sn$_2$S$_6^{4-}$ or S$^{2-}$.[a] |
| AlBr$_3$ | Pt, FePt, Pd with organic surfactants |
| Cl$^-$/Br$^-$ | Bare UCNP, InP NCs |
| Cl$^-$/I$^-$ | Bare UCNP, InP NCs |
| Br$^-$ | Bare UCNP, InP NCs |
| ZnCl$_2$/ZnCl$_4^{2-}$ | Bare UCNP, InP NCs |
| SCN$^-$ | Bare QD, UCNP, FePt NCs |
| AlCl$_4^-$/AlBr$_4^-$ | No stabilization; works in the presence of a small amount of AlBr$_3$ |
| AlCl$_4^-$ | No stabilization; works in the presence of a small amount of AlCl$_3$ or AlBr$_3$ |
| NO$_3^-$ | No stabilization |
| NO$_3^-$/NO$_2^-$ | No stabilization |
| P$^+$P$^-$ | CdSe, QD, Pt, FePt, Fe$_2$O$_3$ with organic surfactants |
| [BMIM]$^+$Cl$^-$ | CdSe, QD, Pt with organic surfactants via phase transfer |
| [BMIM]$^+$I$^-$ | CdSe with organic surfactants via phase transfer |
| [BMIM]$^+$BF$_4^-$ or [EMIM]$^+$[EtSO$_4$]$^-$ | No phase transfer or stabilization for NCs with organic surfactants; works for CdSe with a small volume of [BMIM]$^+$X$^-$ (X = Cl or I) |

[a]In the case of Pd with Sn$_2$S$_6^{4-}$ and QD with Sn$_2$S$_6^{4-}$ and S$^{2-}$, the organic ligands on the NCs were first exchanged with inorganic ligands, such as (N$_2$H$_5$)$_4$Sn$_2$S$_6$ and (NH$_4$)$_2$S, prior to forming the colloids.

Figure 2A:
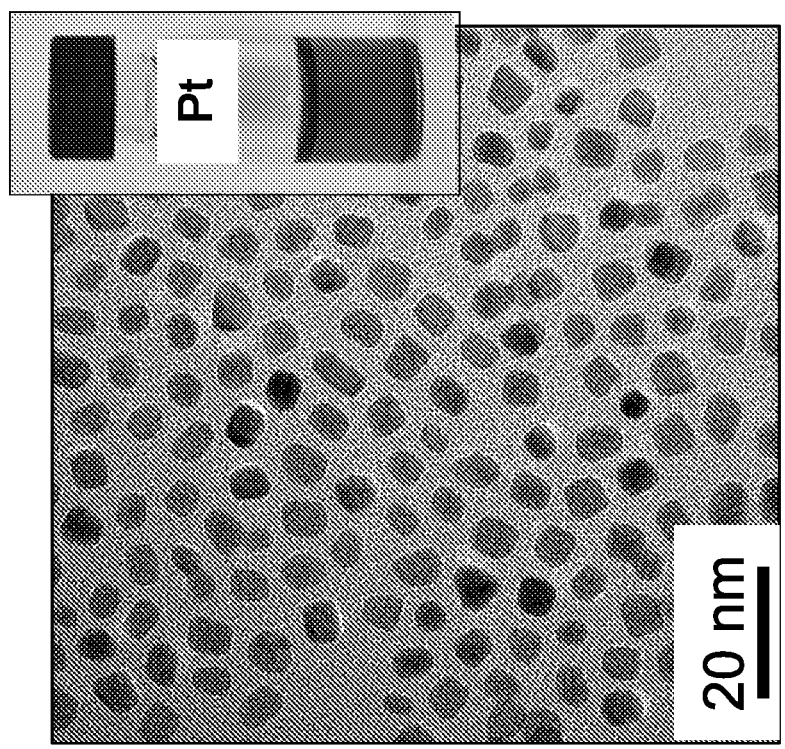
FIGS. 2A-B show TEM images of Pt (FIG. 2A) and $Fe_2O_3$ (FIG. 2B) NCs recovered from $AlCl_3/AlCl_4^-$, and re-functionalized with organic ligands. Insets in these figures show the images of stable colloidal solutions of recovered NCs dispersed in toluene with additional organic ligands.
Figure 2B:
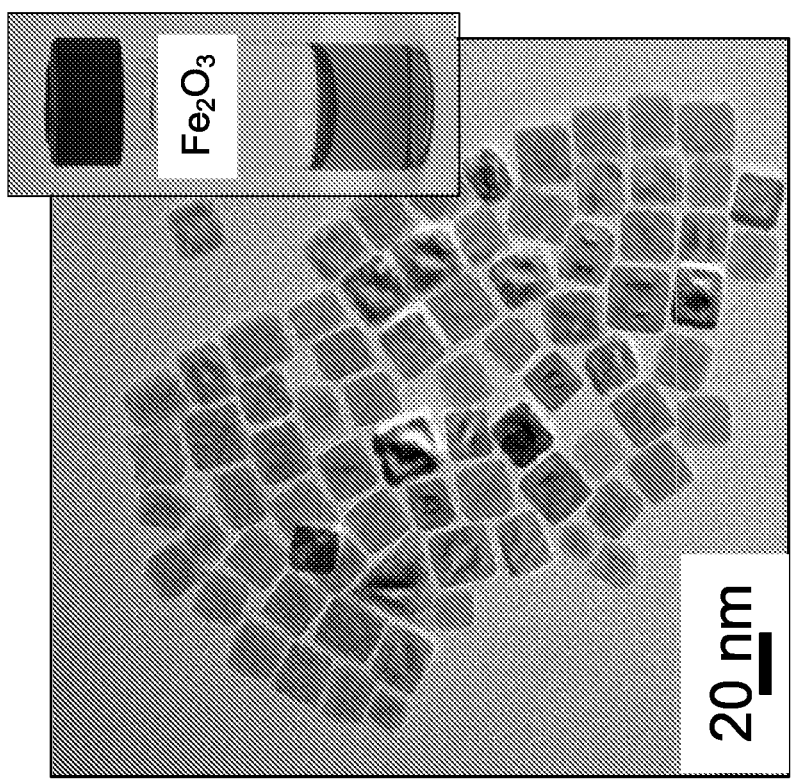
Figure 2C:
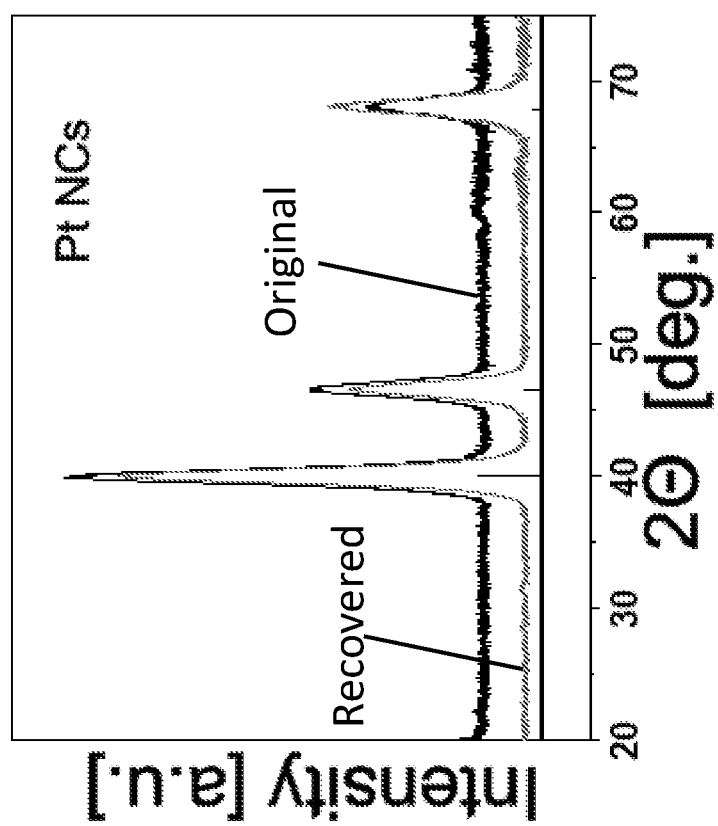
FIG. 2C shows powder X-ray diffraction patterns of original Pt NCs capped with organic ligands and NCs recovered from $AlCl_3/AlCl_4^-$.
Figure 2D:
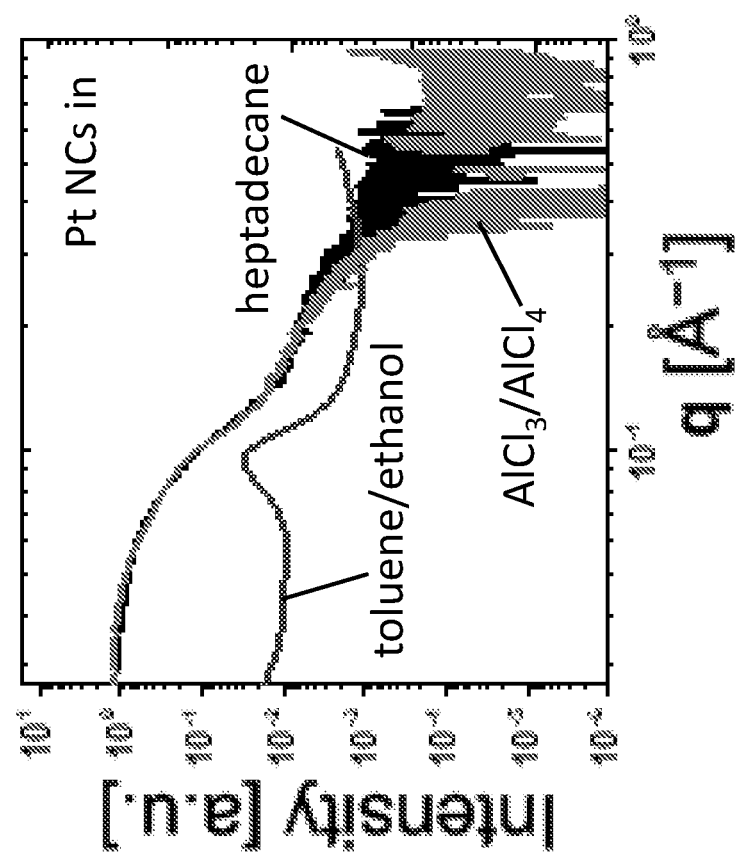
FIG. 2D shows small angle X-ray scattering intensity versus wave factor q of Pt NC colloids in toluene, molten $AlCl_3/AlCl_4^-$, and a mixture of toluene and ethanol.

Formation of the colloidal solutions was further confirmed by Small Angle X-ray Scattering (SAXS). By way of illustration, as shown in FIG. 2D, Pt NCs in the AlCl$_3$/AlCl$_4^-$ eutectic molten salt show a similar SAXS pattern with the stable NC colloid in heptadecane or toluene. In contrast, an evident peak at q~0.1 Å was observed for the unstable suspension of Pt NCs in a mixture of toluene and ethanol due to the structuring in NC aggregates. As further described in the supplemental section below, NCs can be recovered from molten salt. By way of illustration, as shown in FIGS. 2A-B, no significant difference was noticed between the original and recovered NCs in transmission electron microscopy (TEM) images. Similarly, no significant difference was noticed in X-ray diffraction (XRD) patterns.

FTIR spectra (data not shown) of Pt NCs with organic ligands and as recovered from AlCl$_3$/AlCl$_4^-$ were obtained. The absence of vibration peaks of original organic ligands (e.g., C—H stretching at 2800-3000 cm$^{-1}$, C=O stretching at about 1700 cm$^{-1}$) suggests that NCs dispersed in AlCl$_3$/AlCl$_4^-$ are free of organic ligands at the surface. Without wishing to be bound to any particular theory, it is suspected that Al$_2$Cl$_7^-$ (and the minor Al$_2$Cl$_6$ and AlCl$_3$), a very strong Lewis acid, plays a similar role to Me$_3$O$^+$ in Me$_3$OBF$_4$ as the ligand stripping agent. As a consequence, NCs with both organic ligands capped surface and bare surface could be well-stabilized in AlCl$_3$/AlCl$_4^-$.

Figure 1B:
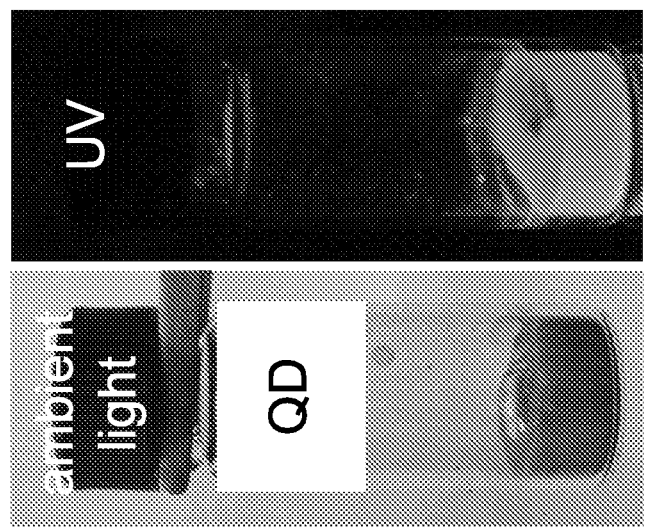
FIG. 1B shows images of quantum dot (QD) colloids in molten NaSCN/KSCN under ambient light or illumination from a UV lamp, demonstrating preservation of their emitting properties.

The NCs dispersed in molten salts preserved their optical properties. For example, as shown in FIG. 1B, CdSe/CdZnS quantum dots (QDs) dispersed in NaSCN—KSCN matrix showed photoluminescence under excitation with UV-light. The UCNPs showed anti-Stokes emission under illumination with a 980-nm near-IR laser (data not shown). These structural, morphological, and optical characterizations provide convincing evidence on the integrity of NCs in molten salts.

As shown in Table 2, not every combination of NCs and molten salts resulted in the formation of stable colloidal solution. In fact, a relation was noticed between colloidal stability and chemical nature of molten salt. This is demonstrated by the example of the NaCl—KCl—AlCl$_3$ mixture where the ratio of the constituents can be varied in some range while keeping T$_m$ below 200° C. (see Table 1). In the mixtures containing 50 mol. % AlCl$_3$ (abbreviated as AlCl$_4$), all AlCl$_3$ reacts with Cl$^-$ ions forming highly stable [AlCl$_4$]$^-$ ions. The resulting NaAlCl$_4$—KAlCl$_4$ molten salt (T$_m$=123° C.) does not contain components with pronounced Lewis acidity (e.g., AlCl$_3$) or basicity (e.g., Cl$^-$) and will be further referred to as "Lewis neutral". On the other hand, the mixtures made from more than 50 mol. % AlCl$_3$ contain reactive [Al$_2$Cl$_7$]$^-$ ions with even a small amount of aluminum halide (in the form of Al$_2$Cl$_6$ or AlCl$_3$), thus forming molten salts with pronounced Lewis acidity. As illustrated in the right panel of FIG. 3A, it was found that Pt NCs (either with native surfactants or bare surface) formed colloidal solutions only in Lewis-acidic NaCl—KCl—AlCl$_3$ containing excess AlCl$_3$ (i.e., >50 mol. % AlCl$_3$). By contrast, as illustrated in the left panel of FIG. 3A, when the Lewis-neutral form of this molten salt was used, severe aggregation of NCs was observed. Similar behavior was observed for Pd and other NCs and also in other Lewis neutral salts like AlCl$_4$$^-$/AlBr$_4$$^-$ (data not shown). The NC colloids in the nitrate melts (e.g., LiNO$_3$—NaNO$_3$—KNO$_3$—CsNO$_3$—Ca(NO$_3$)$_2$, T$_m$~65° C.) were not stabilized (data not shown). On the other hand, mixed alkali metal halide (e.g., LiCl/LiI/KI) or pseudohalide (e.g., NaSCN/KSCN) salts with decent Lewis basicity also provided colloidal stability for bare NCs. In these salts, the ligand stripping exposes the positively charged metal cations on NC surface to the nucleophilic anions, facilitating the binding between NCs and (pseudo)halides.

Organic ionic liquids (ILs), or "molten salts with low melting points (below 100° C.)" (Dupont, J., de Souza, R. F. & Suarez, P. A. Chem. Rev. 102, 3667-3692 (2002)), can be a convenient model for their high temperature counterparts. In this Example, special attention was paid to the NC surface chemistry. It was found that NCs can form colloidal solutions in ILs in two cases. First, stable colloids formed when original NC ligands could be efficiently solvated by IL, as in the case of highly hydrophobic trihexyl(tetradecyl)phosphonium bis(2,4,4-trimethylpentylphosphinate) (further abbreviated as P$^+$P$^-$, photographs and SAXS patterns not shown). The NCs preserved original ligand shell after transfer to IL, as confirmed by NMR, FTIR, and ICP-OES data (not shown). Colloidal stabilization was also observed when IL could not solvate original NC ligands, but contained ions with sufficient nucleophilicity and affinity to NCs (e.g., Cl$^-$ in 1-butyl-3-methylimidazolium chloride, [BMIM]$^+$Cl$^-$). CdSe NCs form a stable colloid in [BMIM]$^+$Cl$^-$ through a phase transfer process, during which ions in ILs completely displaced original organic ligands at the NC surface (see FIG. 3A; NMR, FTIR, and ICP-OES data not shown). No phase transfer or colloidal stabilization occurred if ILs did not contain anions with strong surface binding affinity (e.g., [BMIM]$^+$BF$_4$$^-$ in FIG. 3A). However, an addition of a small amount of surface-binding chloride or iodide ions to [BMIM]$^+$BF$_4$$^-$ resulted in a stable colloid of CdSe NCs (data not shown) free of original organic ligands. The optical features of CdSe NCs were preserved after dispersed in IL and their mixtures with organic solvents (data not shown).

Behavior of NCs in ILs corroborates the observations made for NCs in the molten salts described above. This survey of many combinations of NCs and molten salts/ILs revealed that stable colloids formed only when there was chemical affinity between NC surface and ions present in the molten salt (see Table 2). The components of molten salts can interact with NC surface as σ-donors (e.g., Cl$^-$ and SCN$^-$ can efficiently bind to CdSe NC surface) or σ-acceptors (e.g., electron-rich transition metals as Pt$^0$, Pd$^0$ can form direct chemical bond to AlCl$_3$ as in Pt(PCy$_3$)$_2$(AlCl$_3$) complex with Cy=cyclohexyl). In the latter case, AlCl$_3$ behaves as σ-acceptor, Z-type ligand following the Green's covalent bond classification.

It appears that neither DLVO nor steric repulsion can explain the colloidal stability of NCs in a molten salt. The NC solutes have larger refractive index than molten salt (e.g., n~2.5 for CdSe versus n~1.4 for KCl) and van der Waals attraction cannot be eliminated by index-matching. Given very high charge density in a molten salt, electrostatic potential is screened on the sub-nm distance, making electrostatic repulsion short-ranged and inferior compared to the van der Waals attraction. The absence of brush-like or long hydrocarbon chain species at the NC surface in molten salt also rules out possibility for classical steric stabilization. After considering various non-DLVO forces, but without wishing to be bound to any particular theory, it is proposed that reorganization of molten salt near NC surface is a plausible candidate to explain general phenomenon of colloidal stabilization of NCs in molten salts. Solvent structuring takes place near every solid-liquid interface, regardless of the interaction between surface and solvent. It creates decaying oscillation of solvent density propagating for 5-10 molecular diameters. The density oscillations impose a short-range oscillatory force acting over 1-2 nm distance between two surfaces, often combined with a monotonic repulsive or attractive component. Solvation forces have been observed at many charged and non-charged surfaces and, including solvents with high ionic strengths. Strong ion layering near interfaces has been also seen in molten salts and ILs. As illustrated in FIG. 3B, if NC surface has a strong chemical affinity to one type of ions, it will template the first layer of solvent molecules resulting in additional solvent structuring. Unique to a molten salt, the in-plane periodicity of NC atomic lattice is comparable to the diameters of ions in the liquid phase. As a result, the dense layer of surface-bound ions can induce not only out-of-plane layering, but also in-plane ordering of solvent molecules. According to the contact volume theorem, regardless of the nature of acting forces, the pressure (P) acting on two surfaces separated by a layer of solvent with a thickness D can be expressed as P(D)=k$_B$T[ρ$_s$(D)−ρ$_s$(∞)], where k$_B$ is the Boltzmann constant, T is the temperature and ρ$_s$ is the solvent density at each surface. When two NCs come to close proximity, the increase in ρ$_s$ at small separations, D, leads to a repulsive pressure or inter-particle force. This repulsive force may overcome the van der Waals attractive force if there is a strong interaction between NCs and ions (e.g., Lewis acid-base) due to a higher degree of solvent structuring. In the absence of such specific binding, the attractive force dominates the inter-particle force, leading to the aggregation of NCs.

Inspired by the versatility of colloidal stabilization of NCs in various molten salts, other unconventional inorganic media were tested, such as liquid metals and low-melting oxide glass, as NC solvents. For liquid metals, as in the case of molten salts, efficient removal of native organic ligands allows the NCs to interface with the inorganic solvent. Table 3 provides a list of the liquid metals studied in this Example.

TABLE 3

A list of metals used in this Example (formula are in weight).

| Metal | m.p. (° C.) |
|---|---|
| $Sn_{0.49}Pb_{0.51}$ | ~183 |
| Woods metal ($Bi_{0.5}Pb_{0.267}Sn_{0.133}Cd_{0.1}$) | ~70 |
| Ga—In ($Ga_{0.755}In_{0.245}$) | ~15 |

Figure 4A:
FIG. 4A shows an image of two metal wires soldered by a piece of Woods metal containing Pt NCs.
Figure 4B:
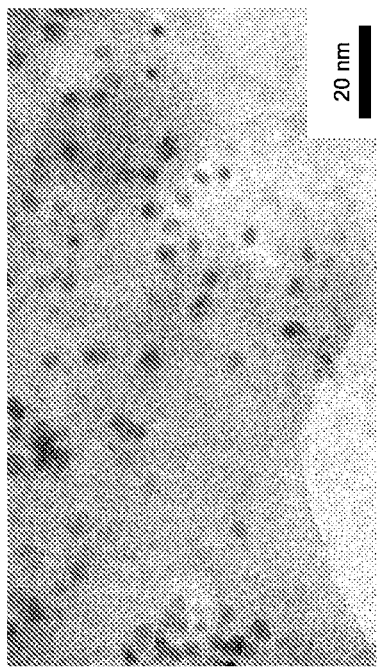
FIGS. 4B-C show TEM images of Pt NCs recovered from Ga—In eutectic.
Figure 4C:
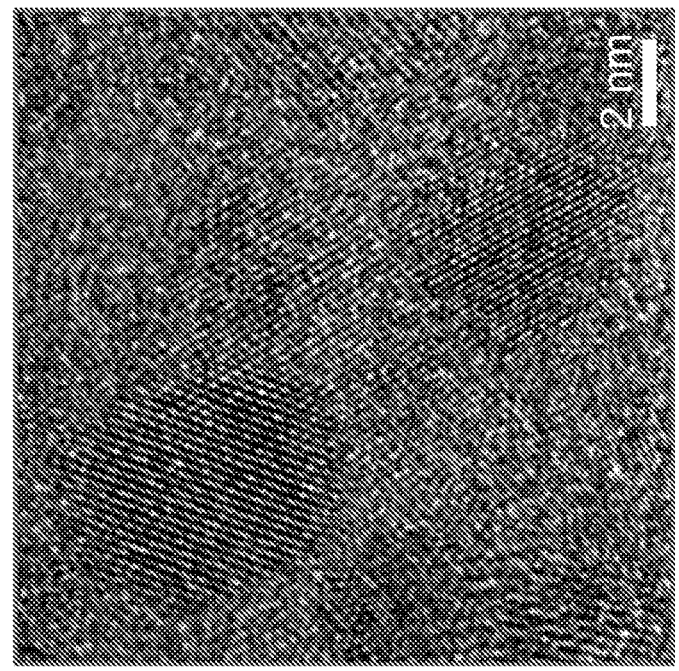
Figure 4D:
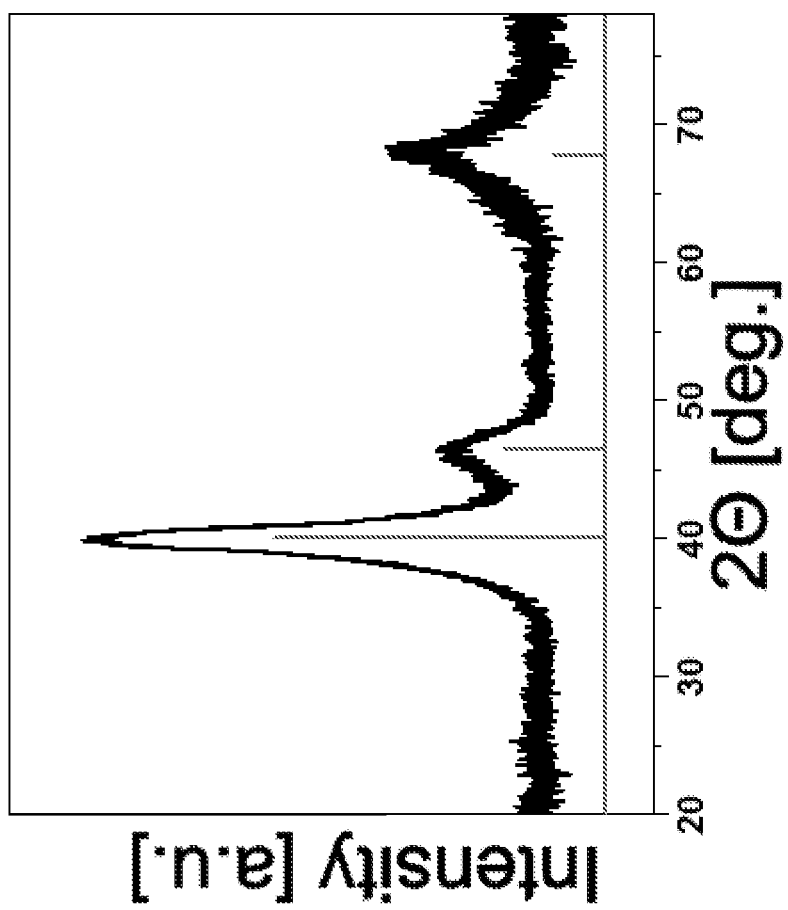
FIG. 4D shows the XRD pattern of Pt NCs recovered from Woods metal. The bottom vertical lines are the diffraction peaks for standard Pt metal.
Figure 5:
FIG. 5 shows an image of a screen-printed pattern of FePt NC@glass composite on a glass substrate.

FIG. 4A shows a composite obtained by exposing ligand-stripped Pt NCs in DMF to the Woods metal (50% Bi, 26.7% Pb, 13.3% Sn, and 10% Cd by weight) at 80° C., i.e., above the $T_m$~70° C. After solidification, the metal slug had a homogeneous appearance and contained 0.1 wt. % Pt based on ICP-OES analysis (corresponding to 25% of the amount of Pt NCs added to Woods metal). According to TEM analysis of thin slices, Pt NCs retained their integrity and were uniformly distributed throughout the metal matrix. Both high-resolution TEM images (d spacing about 2.25 Å, Pt (111)) and XRD pattern (FIG. 4D) of the material recovered after dissolution of Woods metal confirm Pt fcc phase of the NCs distributed through solidified Woods metal matrix. XPS depth profiling was also used to verify uniform distribution of Pt NCs throughout the Woods metal (data not shown). These observations provide strong evidence for the formation of a colloidal dispersion of Pt NCs in a liquid metal. Similar behavior was observed when liquid Ga—In or molten Sn—Pb eutectic with $T_m$~183° C. were used as hosts for Pt NCs instead of Woods metal. (See the TEM images of Pt NCs added to Ga—In in FIGS. 4B-C.) Again, without wishing to be bound to any particular theory, it is speculated that solvent restructuring also plays an important role in NC stabilization in liquid metals.

This Example demonstrates the formation of stable NC colloids in non-conventional media including molten inorganic salts, ionic liquids, liquid metals, and even glass using commercial glass precursors. This Example points to an opportunity to significantly broaden the scope of applications for colloidal nanomaterials, including batteries, solar technologies, catalysis, optical devices, functional windows, metallurgy, soldering, 3D printing, and lubricants. This study builds the foundation for making unprecedented composite materials through integration of precisely surface-engineered nanocomponents into various inorganic hosts through the melt process. It builds the first bridge between traditional solid-state chemistry and the developing field of nanoscience.

Supplementary Section

Inorganic Salts:

LiCl (ultra dry, 99.9%, metal basis, Alfa Aesar), LiBr (99+%, anhydrous, Strem), LiI (ultra dry, 99.999%, metal basis, Alfa Aesar), NaCl (puratronic, 99.999%, metal basis, Alfa Aesar), KCl (99.999%, trace metal basis, Aldrich), KBr (FTIR grade, Alfa Aesar), KI (ultra dry, 99.998%, Alfa Aesar), CsBr (99.999%, metal basis, Alfa Aesar), $ZnCl_2$ (anhydrous powder, 99.995+%, metal basis, Aldrich), $AlCl_3$ (99.99%, trace metal basis, Aldrich), $AlBr_3$ (extra pure, 98+%, anhydrous, ACROS), NaSCN (≥99.99%, trace metal basis, Aldrich), KSCN (ACS reagent, ≥99.0%, Aldrich), $LiNO_3$ (anhydrous, 99%, Alfa Aesar), $NaNO_3$ (ACS, 99% min, Alfa Aesar), $NaNO_2$ (99.999%, metal basis, Alfa Aesar), $KNO_3$ (ReagentPlus, ≥99.0%, Aldrich), $CsNO_3$ (99.8%, metal basis, Alfa Aesar), $Ca(NO_3)_2.4H_2O$ (≥99.0%, Aldrich). $AlCl_3$ was purified by sublimation in a $N_2$-filled glove box (sub-1 ppm $O_2$ and $H_2O$) prior to use. NaSCN and KSCN were dried under vacuum according to the protocol in previous reports such as Igarashi, K. et al. Z. Naturforsch. 46a, 540-544 (1991). Anhydrous $Ca(NO_3)_2$ was obtained by the dehydration of $Ca(NO_3)_2.4H_2O$ (Dancy, E. A. & Nguyen-Duy, P. Thermochimica Acta 42, 59-63 (1980)). Other nitrates and $NaNO_2$ were dried in a vacuum oven at about 150° C. prior to use (Dancy, E. A. & Nguyen-Duy, P. Thermochimica Acta 42, 59-63 (1980); Janz, G. J. & Truong, G. N. J. Chem. Eng. Data 28, 201-202 (1983)). The eutectic nitrate or nitrate/nitrite salts can also be prepared in the way described by Cordaro et al. (SolarPACES (Granada, Spain, 2011)). Caution: Most of the salts used in this work are highly hygroscopic and should be kept and handled in a $N_2$-filled glovebox. (Eutectic) Molten salts with various compositions (Table 1) were prepared by hand-grinding. The mixtures were then heated at temperatures slightly above the melting points of the molten mixtures.

Ionic Liquids (ILs):

1-butyl-3-methylimidazolium chloride ($[BMIM]^+Cl^-$, 98%), 1-butyl-3-methylimidazolium tetrafluoroborate ($[BMIM]^+BF_4^-$, 98%), 1-ethyl-3-methylimidazolium ethyl sulfate ($[EMIM]^+[EtSO_4]^-$, 98%), 1-butyl-3-methylimidazolium octylsulfate ($[BMIM]^+[OctSO_4]^-$, 98%), trihexyl (tetradecyl)phosphonium bis(2,4,4-trimethylpentyl)phosphinate ($P^+P^-$, min. 95%) were purchased from Strem. 1-butyl-3-methyl iodide ($[BMIM]^+I^-$, 99%) was purchased from Aldrich. All ILs were stored under an inert atmosphere and baked at 80° C. under vacuum for 24 h prior to use.

Metal Alloys:

Gallium-Indium eutectic (Ga—In, 99.99%, trace metal basis, Aldrich), Woods metal (stick, Aldrich), Sn—Pb eutectic was prepared by melting a mixture of tin powders (100 mesh, 99.999%, metal basis, Alfa Aesar) and lead granules (99.999%, Strem) in an oven at 400° C. The compositions and melting points of metal alloys/eutectics are listed in Table 3.

Organic Solvents and Organic Ligands:

Tri-n-octylphosphine oxide (TOPO, 99%), oleic acid (OA, 90%), oleylamine (OLA, 70%), N,N-dimethylformamide (DMF, anhydrous, 99.8%), toluene (anhydrous, ≥99.8%), acetonitrile (anhydrous, ≥99.8%), acetone (≥99.5%), methanol (anhydrous, 99.8%), ethanol (anhydrous, 200 proof, ≥99.5%), diethyl ether (anhydrous ≥99.0%), tetrahydrofuran (THF, anhydrous, ≥99.9%), hexane (anhydrous, 95%), octane (anhydrous, ≥99%), decane (anhydrous, ≥99%), heptadecane (99%), dichloromethane ($CH_2Cl_2$, ≥99.9%) were purchased from Sigma Aldrich. Tri-n-octylphosphine (TOP, 97%) and N-methylformamide (NMF, 99%) were purchased from Alfa Aesar. Solvents were dried prior to use in the glovebox.

Synthesis of Nanocrystals (NCs) with Coordinated Organic Ligands.

Nanocrystal (NC) syntheses were performed according to reported protocols using conventional air-free techniques including Schlenk line and $N_2$-filled glovebox. Pt NCs (mean size 5-6 nm) (Wang, C., et al. Angew. Chem. Int. Ed. 47, 3588-3591 (2008)), Pd NCs (4.0 nm) (Dirin, D. N. et al. J. Am. Soc. Chem. 136, 6550-6553 (2014)), FePt NCs (3.5 nm) (Son, J. S., et al. J. Phys. Chem. Lett. 4, 1918-1923 (2013)), $Fe_2O_3$ NCs (about 20 nm) (Park, J. et al. Nat. Mater. 3, 891-895 (2004)), InP NCs (3.5 nm) (Baek, J., et al. Angew. Chem. Int. Ed. 50, 627-630 (2011); Battaglia, D. & Peng, X. Nano Lett. 2, 1027-1030 (2002)), CdSe NCs (wurtzite, 4 nm, with native ligands of OA-TOP-TOPO) (Zhang, H., et al. ACS Nano 8, 7359-7369 (2014)), alpha-$NaYF_4$: Yb, Er@$CaF_2$ upconverting nanoparticles (UCNPs, about 23 nm) (Punjabi, A. et al. *ACS Nano* 8, 10621-10630 (2014)). CdSe/CdZnS core/shell quantum dots (QDs, with phosphonic acid or carboxylic acid ligands) were provided by QDvision.

Ligand Stripping Procedures for NCs.

To facilitate the stabilization of NCs in some molten salts and liquid metals, various ligand stripping agents were used to remove the native hydrocarbon ligands on NC surfaces following reported procedures. For instance, 2 mL of FePt (or Pt, Pd, $Fe_2O_3$, UCNP) NC dispersion in hexane (5 mg/mL) was mixed with 2 mL of 0.01 M nitrosonium tetrafluoroborate ($NOBF_4$, 97%, Aldrich) solution in $CH_2Cl_2$ (Dong, A. et al. *J. Am. Soc. Chem.* 133, 998-1006 (2011)). The mixture was vigorously stirred until the precipitation of NCs as a result of the removal of the original organic ligands, typically within 30 min. In the case of UCNPs, long-term stirring (up to 10 h) was required. The naked (or bare) NCs were separated from the supernatant by centrifugation and dispersed well in DMF. To purify these bare NCs, a mixture of toluene/hexane (1:1 in volume) was added as the non-solvent to flocculate NCs, followed by the re-dispersion of NCs in fresh DMF. This purification process can be repeated 2-3 times. Finally, bare NCs were dispersed in DMF. To strip of the TOP-TOPO ligands on InP NCs, tetrafluoroboric acid ($HBF_4$, 55-55% w/w with diethyl ether, Alfa Aesar) was used, as described in Huang, J. et al. *ACS Nano* 8, 9388-9402 (2014). Bare CdSe NCs and QDs were achieved with the use of trimetyloxonium tetrafluoroborate ($Me_3OBF_4$, 95%, Aldrich) (Huang, J. et al. *ACS Nano* 8, 9388-9402 (2014); Rosen, E. L. et al. *Angew. Chem. Int. Ed.* 51, 684-689 (2012)). Ligand exchange of Pt NCs and QDs with $Sn_2S_6^{4-}$ and $S^{2-}$ were also performed according to Kovalenko, M. V., et al., *Science* 324, 1417-1420 (2009); and Nag, A. et al. *J. Am. Soc. Chem.* 133, 10612-10620 (2011).

NC Colloids in Molten Salts (Inorganic Salts).

NCs can be stabilized in $AlCl_3/AlCl_4^-$ (see Table 1) by simply adding a small volume of NC dispersion in hexane into molten $AlCl_3/AlCl_4^-$. For instance, a small drop (0.025 mL) of hexane containing 1-5 mg of Pt NCs was quickly added to 0.6 g (about 0.4 mL in molten state) of molten $AlCl_3/AlCl_4^-$. Upon contact, hexane vaporized due to the high temperature of the salt phase, while the Pt NCs formed a stable, black colloid in $AlCl_3/AlCl_4^-$ under stirring with a pyrex glass-coated stir bar. The colloids of Pt NCs in $AlCl_3/AlCl_4^-$ can also be achieved through a "solvent-free" method. Dried NC solids were mixed with solidified $AlCl_3/AlCl_4^-$, followed by heating at about 120° C. with stirring. A homogeneous Pt NC colloid was typically obtained within 30 min. A third procedure toward Pt NC colloid in $AlCl_3/AlCl_4^-$ involves a phase transfer process. In this procedure, a decane solution of Pt NCs (about 0.3 mL, 5 mg/mL) was combined with molten $AlCl_3/AlCl_4^-$ (about 0.3 mL). The resulting mixture was stirred until NCs transferred from the upper phase into the molten salt solvent, typically within 15 min. Using the above procedures, various NCs (Pd, FePt, UCNP, etc.) with coordinated organic ligands, naked surface, or inorganic ligands (the last two typically through the "solvent-free" method) can form stable colloids in $AlCl_3/AlCl_4^-$. $Fe_2O_3$ NC colloid in $AlCl_3/AlCl_4^-$ was obtained from dried bare NCs using the "solvent-free" method. Depending on a number of factors, including the type and concentration of NCs and the dispersion methods, it may take from less than 5 min to hours to form stable NC colloids.

Stable NC colloids in halide (e.g., LiCl/LiI/KI) or pseudo-halide based (NaSCN/KSCN) molten salts were obtained from bare NCs/molten salts mainly using the "solvent-free" method. For instance, about 5 mg of dried bare UCNPs was mixed with 0.5 g of NaSCN/KSCN (about 0.3 mL in the molten state at about 130° C.) at room temperature. The resulting mixture was stirred at 130° C. for several hours until UCNPs formed a homogeneous, stable colloid in the molten salt. A similar procedure can be applied to other bare NCs. It typically takes several hours to 2 days to disperse the NC solids in salts, depending on the combination of NCs and salts, the concentration of NCs, and the stirring conditions, etc.

For further morphological, structural, surface, and compositional characterizations, NCs were recovered from molten salts. Depending on the compositions of molten salts, a single or a series of solvents were used to dissolve the salt matrices, followed by the collection of NC solids by centrifugation. For example, to recover NCs from $AlCl_3/AlCl_4^-$, a sequential washing procedure with a large excess of anhydrous diethyl ether and THF was performed in a $N_2$-filled glovebox. These aprotic solvents can dissolve the Lewis acidic components ($Al_2Cl_7^-$ with minor $Al_2Cl_6$, $AlCl_3$) by forming Lewis acid-base complexes. (Note: Any residual water/moisture or protic solvents may react with $Al_2Cl_7^-$, $AlCl_3$ (or $Al_2Cl_6$), forming (super-) acidic species which may damage NCs.) Afterward, the residual salts were dissolved in methanol and water in the air. NCs were collected by centrifugation, washed with water to remove any residual salt, and dried prior to characterizations. Similarly, NCs can be recovered from $AlBr_3$ (using anhydrous ACN), NaSCN/KSCN (acetone or water), LiCl/LiI/KI (methanol), and other salt matrices.

In some cases, the recovered NC solids from molten salts can be functionalized using the additional organic ligands and re-dispersed in non-polar solvents (toluene or hexane) with the assistance of sonication. For instance, 5 mg of dried Pt NCs (or Pd, $Fe_2O_3$ NCs) recovered from $AlCl_3/AlCl_4^-$ can form a stable solution in 1 mL of toluene after being sonicated for about 30 min, with the addition of 0.1-0.2 mL of OA and OLA, respectively. Conventional washing cycles with toluene/ethanol as solvent/non-solvent can be applied to purify these NCs and remove the excess organic ligands. Finally, NCs functionalized by organic ligands were dispersed in toluene or hexane.

NC Colloids in ILs.

NCs (CdSe, Pt, $Fe_2O_3$, FePt, QDs, etc.) functionalized by organic ligands in toluene were dried under vacuum to remove organic solvents. In a $N_2$-filled glovebox, the dried NCs were mixed with hydrophobic ILs such as $P^+P^-$. After stirring for less than 30 min, a stable solution of NCs in $P^+P^-$ was obtained with a sizable concentration (50 mg/mL or higher). The NC dispersions in $P^+P^-$ can be diluted with common non-polar solvents like toluene without affecting the colloidal stability. Adding acetonitrile or ethanol to NC dispersions in $P^+P^-$/toluene resulted in the flocculation of the solution. After centrifugation, NCs were recovered and re-dispersed in toluene, leaving $P^+P^-$ in the supernatant.

A phase transfer process was employed to disperse NCs in hydrophilic ILs like $[BMIM]^+Cl^-$ or $[BMIM]^+I^-$ in a $N_2$-filled glovebox. Briefly, 1.0 mL of OA-TOP-TOPO-capped CdSe NCs in octane (15 mg/mL) was mixed with 1.0 g of $[BMIM]^+Cl^-$ (about 0.95 mL at 80° C.), forming a bilayer mixture. Upon vigorous stirring at 80° C. (the melting point of $[BMIM]^+Cl^-$ is 73° C.), NCs gradually transferred into ILs within several hours, resulting in a colorless top phase. The red bottom phase (in $[BMIM]^+Cl^-$) was rinsed with fresh octane several times to remove residual organic ligands. Afterward, the slightly turbid IL phase was rinsed multiple times with ethyl acetate to break the emulsions presumably from residual oleates, resulting in a stable CdSe NC colloid in [BMIM]$^+$Cl$^-$. These NC colloids in [BMIM]$^+$Cl$^-$ are stable under inert atmosphere for several months. Alternatively, CdSe NCs in [BMIM]$^+$Cl$^-$ can be precipitated out by adding acetonitrile, and separated from the supernatant containing acetonitrile and [BMIM]$^+$Cl$^-$. The recovered CdSe NCs can be re-dispersed in fresh [BMIM]$^+$Cl$^-$, forming a stable colloid with gentle heating and stirring. In addition, CdSe NCs/[BMIM]$^+$Cl$^-$ remained stable after the dilution with polar organic solvents like NMF. NCs can also be recovered by adding H$_2$O to the solution in NMF followed by centrifugation.

Phase transfer of OA-TOP-TOPO-capped CdSe NCs from octane to ILs was also observed when [BMIM]$^+$I$^-$ was used as the bottom phase. Similar purification processes were applied to achieve a stable CdSe NC colloid in [BMIM]$^+$I$^-$ or to recover NCs from [BMIM]$^+$I$^-$. In the cases of [BMIM]$^+$BF$_4^-$, [EMIM]$^+$[EtSO$_4$]$^-$, or [BMIM]$^+$[OctSO$_4$]$^-$, no phase transfer was observed. However, CdSe NCs can be stabilized in [BMIM]$^+$BF$_4^-$ or [EMIM]$^+$[EtSO$_4$]$^-$ in the presence of a small amount of [BMIM]$^+$Cl$^-$ or [BMIM]$^+$I$^-$. For instance, CdSe NCs in 0.05-1 g of [BMIM]$^+$Cl$^-$ maintained the colloidal stability after the dilution with 1.0 mL of [EMIM]$^+$[EtSO$_4$]$^-$.

NC Colloids in Liquid Metals.

2 mL of Pt NC dispersion (1-5 mg/mL) in toluene (with original OA and OLA ligands) or DMF (bare NCs) was stirred in the presence of a droplet of liquid metal (about 0.5 g, Ga—In or Woods metal) at 80° C. for about 3 days. To disperse Pt NCs in Sn—Pb alloy, heptadecane was used as the solvent and the mixture was heated at 220° C. During the stirring, the destabilization of bare Pt NCs in DMF was usually observed. After stirring, the mixture was allowed to cool down to room temperature. The metal drop was carefully separated from the supernatant and the insoluble NC precipitates (in the case of bare NCs in DMF), followed by washing with fresh toluene or DMF to remove NC residue on the surface of metal. For Woods metal and Sn—Pb alloy, the solidified metal drops were polished with fine sand paper for a thorough removal of insoluble NC residue on the surface.

Pt NCs can be recovered by digesting the metal matrices with acids. Ga—In can be digested with HCl (≥37%, TraceSELECT, for trace analysis, fuming, Aldrich); Woods metal or Sn—Pb alloy was digested by a mixture of HNO$_3$ (≥69%, TraceSELECT, for trace analysis, Aldrich) and HF (48 wt. % in water, ≥99.99%, metal traces, Aldrich) diluted by DI water. Pt NCs were stable toward HCl or HNO$_3$/HF (but not aqua regia!) and separated from the acidic solution by centrifugation, followed by rinsing with DI water.

Fabrication of NC@Glass Composite.

The Pb-based glass frit paste (FX11-036 Sealing Glass) was provided by Ferro Electronic Materials, and used as a precursor for glass layer. It contains ~85-86 wt. % of inorganic solids (mainly micro-sized glass powders) in texanol (2,2,4-trimethyl-1,3-pentanediol monoisobutyrate), together with a small amount of organic binders. NCs (Feet, Pt, Pd, Fe$_2$O$_3$ or UCNP) capped with organic ligands dispersed well in texanol. In some cases, several drops of toluene were added to the NC/glass frit paste mixture to help the dispersion of NCs.

To fabricate thin layers of glass embedding NCs (NCs@glass), NCs in a small volume of texanol or toluene/texanol (several milligrams of NCs in <0.05 mL of solvent) were thoroughly mixed with the glass frit paste (about 0.3-0.4 g). The resulting paste was printed on a glass substrate (1×1 inch) through a pre-patterned screen (250 mesh) using a screen printer (Zhuhai Kaivo Optoelectronic Technology Co., Ltd., China). The processing of the glass frit paste, including the screen printing and thermal annealing, was described by Ferro (FX11-036 Sealing Glass from Ferro Corporation, http://www.ferro.com/). After the glazing of glass powders (400-425° C.), NCs were homogenously distributed and embedded in a thin, patterned glass layer and well-protected from direct contact with the external environment.

Transmission Electron Microscopy (TEM) of Recovered NCs from Liquid Media.

TEM images of NCs recovered from molten salts or liquid metals were obtained using a 300 kV FEI Tecnai F30 microscope. The NC solids were suspended in hexane and drop-cast on a carbon-coated copper grid. The TEM images of re-functionalized Pt or Fe$_2$O$_3$ NCs were prepared by drop-cast NC dispersion in toluene on TEM grids.

Wide Angle Powder X-Ray Diffraction (XRD) of Recovered NCs.

The structural information (phase, grain size, etc.) of NCs recovered from molten inorganic salts, ILs, and liquid metals were assessed from XRD patterns using a Bruker D8 diffractometer with a Cu K$_\alpha$ X-ray source operating at 40 kV and 40 mA.

Small angle X-ray scattering (SAXS) spectra of NCs in molten inorganic salts and ILs. In order to study the colloidal stability of NCs in molten inorganic salts and ILs, SAXS measurements were carried out at beamline 12-IDB at Advanced Photon Source, Argonne National Laboratory. NCs in these liquid media were sealed in glass capillaries (0.3-0.8 mm) using flame or epoxy under inert atmosphere. The mixture of NCs in AlCl$_3$/AlCl$_4^-$ or [BMIM]$^+$Cl$^-$ in the capillaries were heated to molten state using a home-built heating apparatus during the measurement. The concentration of NC colloids was about 5 mg/mL for SAXS measurement. For comparison, NC solutions/suspensions in toluene, heptadecane, and a mixture of toluene/ethanol with similar concentrations were also measured.

Photographs of Pt NCs in AlCl$_3$/AlCl$_4^-$ at Various Temperatures Under a Microscope.

A minute amount of solidified Pt NCs in AlCl$_3$/AlCl$_4^-$ was flame-sealed in a glass capillary under inert atmosphere. The flame-sealed capillary was then fixed onto a steel heating stage using a thermal stable adhesive (RESBOND™ 907, COTRONICS Corporation). The photographs of NCs in molten salts at various temperatures were taken under a Horiba LabRamHR Evolution confocal Raman microscope equipped with a temperature-controllable heating apparatus.

Optical Absorption Measurements of CdSe NCs in ILs.

The UV-vis spectra of CdSe NCs in toluene, P$^+$P$^-$, [BMIM]$^+$I$^-$, and mixed solvents were collected using a Cary 5000 UV-Vis-NIR spectrophotometer.

Fourier-Transform Infrared (FTIR) Spectra of Recovered NCs.

FTIR spectra of Pt NCs recovered from AlCl$_3$/AlCl$_4^-$ and CdSe NCs recovered from P$^+$P$^-$ and [BMIM]$^+$Cl$^-$ or [BMIM]$^+$I$^-$ were acquired in transmission mode using a NicoletNexus-670 FTIR spectrometer. For quantitative comparison, the same amount of dried organically-capped or recovered NC solids were mixed with KBr powder and pressed into pellets with the same dimension.

$^1$H NMR of CdSe NC Colloids in Toluene and P$^+$P$^-$/toluene.

$^1$H NMR spectroscopy was recorded at 500 MHz on a Bruker Ultrashield 500 plus spectrometer. OA-TOP-TOPO-capped CdSe NCs in hexane were dried thoroughly and re-dispersed in 1.0 mL of d$^8$-toluene with a concentration of 25 mg/mL. To probe the OA ligands on CdSe NCs in P$^+$P$^-$, 0.1 mL of CdSe/P$^+$P$^-$ (25 mg/mL) was diluted with 1.0 mL of d$^8$-toluene. To test the existence of OA ligands in CdSe NCs in [BMIM]$^+$Cl$^-$, original organic ligands were recovered by digesting CdSe NCs/[BMIM]$^+$Cl$^-$ to avoid the interference from the imidazolium ILs. In brief, DI water was added to CdSe NCs/[BMIM]$^+$Cl$^-$ (1.0 mL, 25 mg/mL) to precipitate out CdSe NCs while dissolving the IL matrix. The NC precipitates were rinsed several times to completely remove [BMIM]$^+$Cl$^-$. Afterward, NCs were digested in half-concentrated aqua regia following the standard procedure (Kovalenko, M. V., et al. *Science* 324, 1417-1420 (2009); Peng, Z. A. & Peng, X. *J. Am. Soc. Chem.* 123, 1389-1395 (2001); Yu, W. W., et al. *Chem. Mater.* 15, 4300-4308 (2003)). The organic ligands (OA/TOP/TOPO), if any, were then extracted with diethyl ether, dried under vacuum, and dissolved in d$^8$-toluene (1.0 mL) for NMR study. All samples were measured at 298 K.

Inductively Coupled Plasma Optical Emission Spectroscopy (ICP-OES) Analysis.

ICP-OES analysis of samples digested in acidic aqueous solutions was carried out on an Agilent 700 Series spectrometer. To probe the TOP-TOPO ligands on the surface of CdSe NCs in toluene, P$^+$P$^-$, [BMIM]$^+$Cl$^-$, the same amount of NCs recovered from various solvents was digested by HNO$_3$ and diluted with DI water. A piece of Woods metal (about 0.45 g) containing bare Pt NCs was digested by aqua regia, and diluted by DI water to determine the concentration of Pt NCs.

Distribution of Pt NCs in Woods Metal by X-Ray Photoelectron Spectroscopy (XPS).

XPS analysis of solidified Woods metal pieces containing Pt NCs was performed on a Kratos Axis Nova spectrometer using a monochromatic Al Kα source (hv=1486.6 eV). The Al anode was powered at 10 kV and 10 mA. The instrument work function was calibrated to give an Au 4f$_{7/2}$ metallic gold binding energy (BE) of 83.95 eV. Instrument base pressure was 1×10$^{-9}$ Torr. Survey spectra were collected using an analysis area of 0.3×0.7 mm$^2$ and 160 eV pass energy. Pt 4f high-resolution spectra were collected using an analysis area of 0.3×0.7 mm$^2$ and 20 eV pass energy. The photoelectron takeoff angle with respect to the sample surface normal was 90°. The depth profile of Pt in Woods metal was recorded during the etching of Woods metal by an Ar$^+$ ion gun operated at 4 keV and a current of 140 μA. The raster size was 3×3 mm$^2$ with a current density of about 75 μA/cm$^2$. The etching rate (z/t) of Woods metal was estimated by the formula, $$z/t = \frac{M_W}{(rN_Ae)} \times Sj_P,$$

where M$_W$ is the molar weight of the material (kg/mol), r is the density of the material (kg/m$^3$), N$_A$ is the Avogadro number, e is the unit charge, S is the sputtering yield (atom/ion), and j$_P$ is the primary ion current density (A/m$^2$). The sputtering yield of different metals in Woods metal is estimated by the empirical equations for sputter yields at normal incidence. As a result, the etching rate was estimated to be roughly 1 nm/s. XPS analysis was also performed on a cross-section of a cut Woods metal containing Pt NCs to study the distribution of Pt NCs in the interior of Woods metal.

Example 2

This Example illustrates the use of the present colloids as media to conduct chemical transformations using the inorganic nanocrystals contained therein. Specifically, this Example illustrates the formation of a shell over the inorganic nanocrystals of the colloid, thereby forming core-shell nanocrystals.

Ligand-stripped InP nanocrystals were prepared according to the techniques described in Example 1, above. Colloids including the InP nanocrystals dispersed in a molten inorganic salt were prepared as described in Example 1, above. Two molten inorganic salts were used, GaI$_3$ (T$_m$=212° C.) (in order to form Ga-containing shells) and ZnCl$_2$:NaCl:KCl=60:20:20 (mol %) (in order to form Zn-containing shells). Shell precursors were added to the respective colloids. In order to form GaP shells, an excess of phosphine hexamethylphosphorous triamide (P(NMe$_2$)$_3$) was added to colloids containing the Ga-containing molten inorganic salt. In order to form ZnS shells, an excess of either K$_2$S or bis(trimethylsilyl)sulfide (TMS$_2$S) was added to colloids containing the Zn-containing molten inorganic salt at 250° C. In order to form ZnSe shells, an excess of bis(trimethylsilyl)selenide (TMS$_2$Se) was added to colloids containing the Zn-containing molten inorganic salt at 250° C. The colloids were kept at the elevated temperature for one hour to complete shell growth. In general, the growth conditions (e.g., amount of shell precursor, reaction time) may be adjusted depending upon the composition of the core nanocrystal and the desired number of shells/shell thickness.

Colloids were analyzed using photoluminescence spectroscopy, X-ray diffraction, Raman spectroscopy and ICP-OES, as described in Example 1, above.

The core-shell nanocrystals, once formed, can be recovered as a colloidal solution in solvents, e.g., toluene, by the addition of organic capping ligands.

Figure 6A:
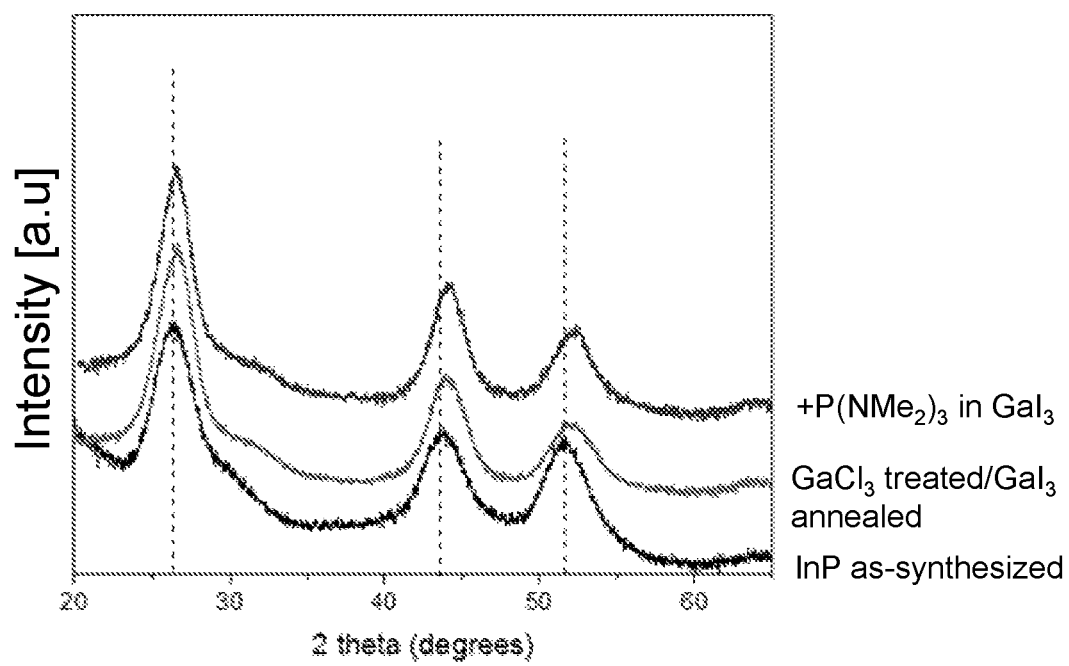
FIG. 6A shows XRD patterns of InP NCs as-synthesized (bottom), InP NCs GaCl$_3$ treated and recovered from a Ga-containing molten inorganic salt (middle), and InP NCs recovered from a Ga-containing molten inorganic salt with added P-containing shell precursor (top).
Figure 6B:
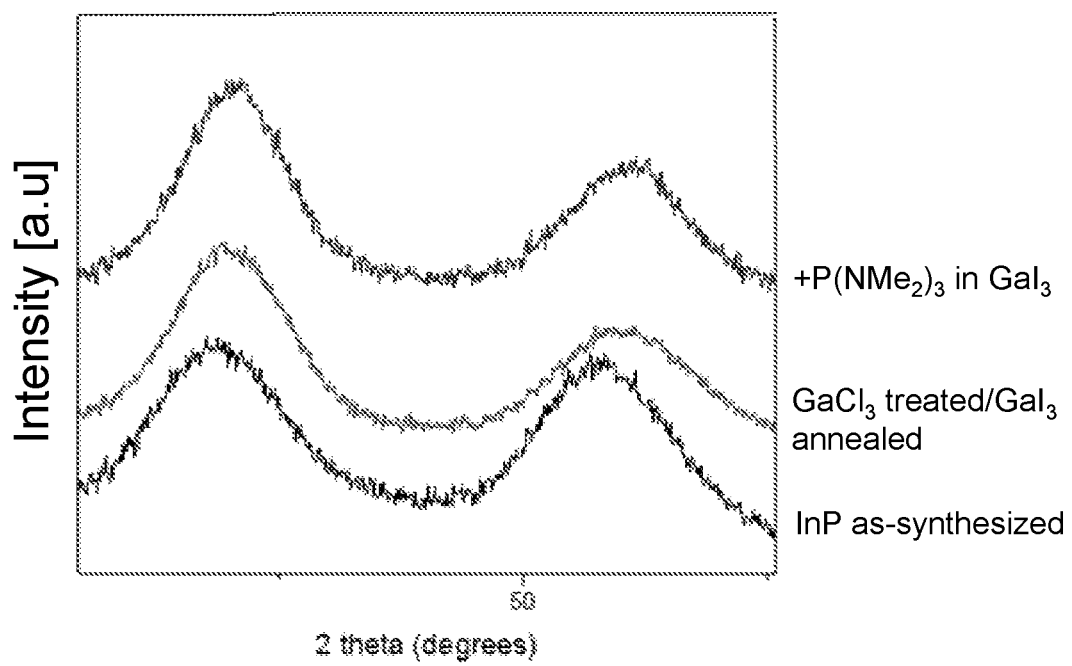
FIG. 6B is a zoomed-in view of FIG. 6A.

InP—GaP Core-Shell Nanocrystals:

FIGS. 6A-B show the XRD patterns of as-synthesized InP nanocrystals (bottom); InP nanocrystals treated with GaCl$_3$ recovered from GaI$_3$ (middle) and InP nanocrystals recovered from GaI$_3$ with the addition of P(NMe$_2$)$_3$ shell precursor (top). The shift in the X-Ray diffraction peaks to higher 2 theta values for the top curve only (see FIG. 6B) is evidence of the formation of a GaP shell over the InP nanocrystals.

Table 4, below, summarizes the ICP-OES analysis of recovered InP nanocrystals. These results demonstrate the incorporation of Ga only when the Ga-containing molten inorganic salt (GaI$_3$) is used ("In bare_1,2_GaI$_3$" as compared to the as-synthesized InP nanocrystals "InP_bare_1, 2").

TABLE 4

ICP-OES of recovered InP nanocrystals.

| Sample | In:P (in moles) | Ga:P (in moles) |
|---|---|---|
| InP bare_1 | 1.15 | 0 |
| InP bare_2 | 1.14 | 0 |
| In bare_1_GaI$_3$ | 0.94 | 0.26 |
| In bare_2_GaI$_3$ | 0.95 | 0.26 |

Figure 7:
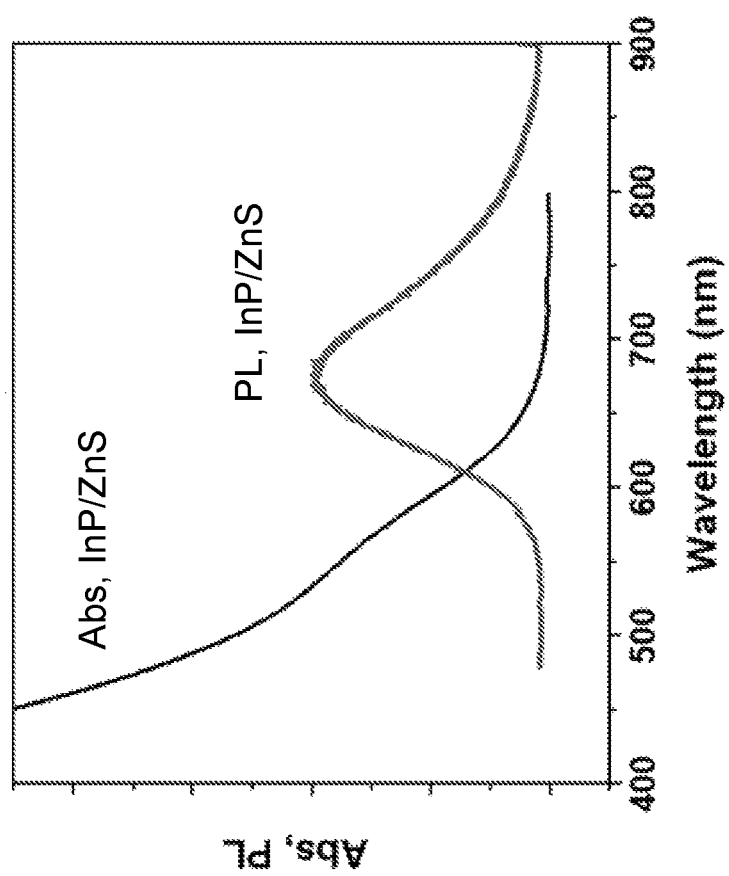
FIG. 7 shows absorption and photoluminescence spectra of InP—ZnS core-shell NCs formed according to an illustrative embodiment.

InP—ZnS and InP—ZnSe Core-Shell Nanocrystals:

FIG. 7 shows representative absorption and photoluminescence spectra for InP nanocrystals dispersed in ZnCl$_2$—NaCl—KCl molten inorganic salt with the addition of TMS$_2$S shell precursor. The observed Stokes shift is comparable to that seen for conventionally grown core-shell nanoparticles.

Figure 8:
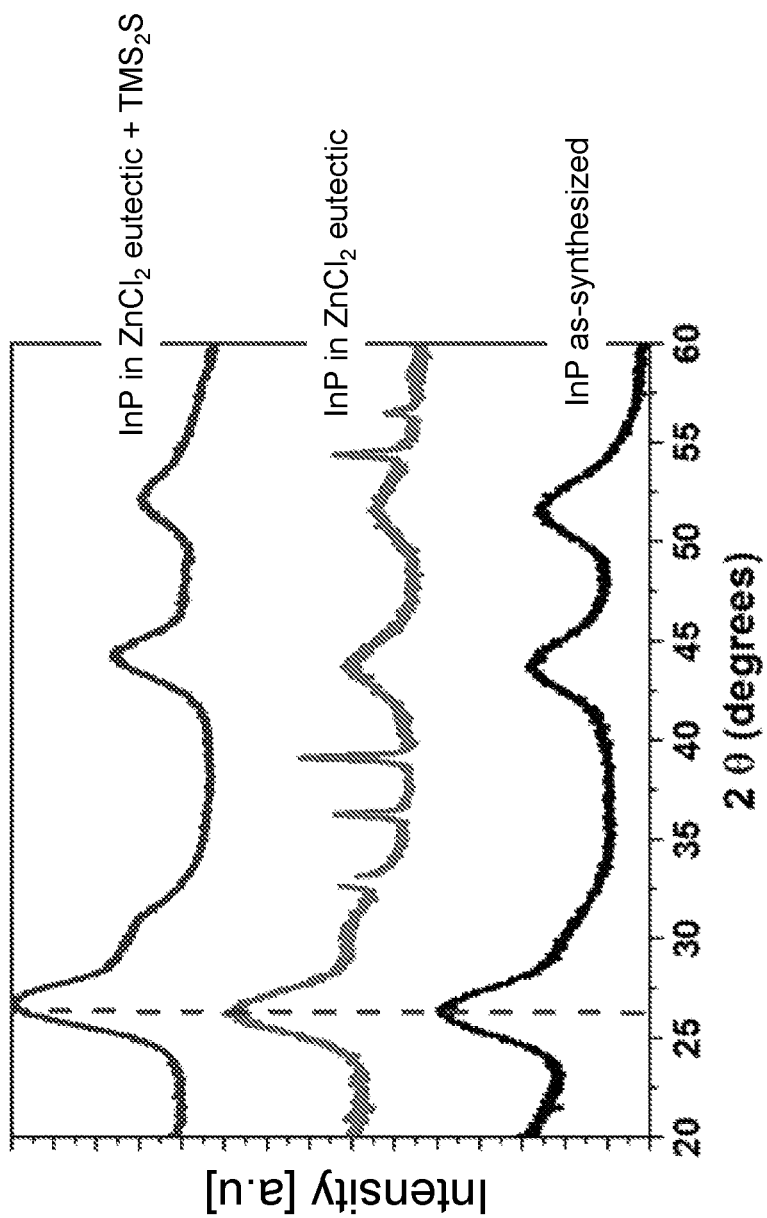
FIG. 8 shows XRD patterns of InP NCs as-synthesized (bottom), InP NCs recovered from a Zn-containing molten inorganic salt (middle), and InP NCs recovered from a Zn-containing molten inorganic salt with added S-containing shell precursor (top).

FIG. 8 shows the XRD patterns of as-synthesized InP nanocrystals (bottom); InP nanocrystals recovered from ZnCl$_2$—NaCl—KCl (middle) and InP nanocrystals recovered from ZnCl$_2$—NaCl—KCl with the addition of TMS$_2$S shell precursor (top). As illustrated by the dotted line, there is a shift in the X-ray diffraction peaks to higher 2 theta values for the top curve only which is evidence of the formation of a ZnS shell over the InP nanocrystals.

Figure 9:
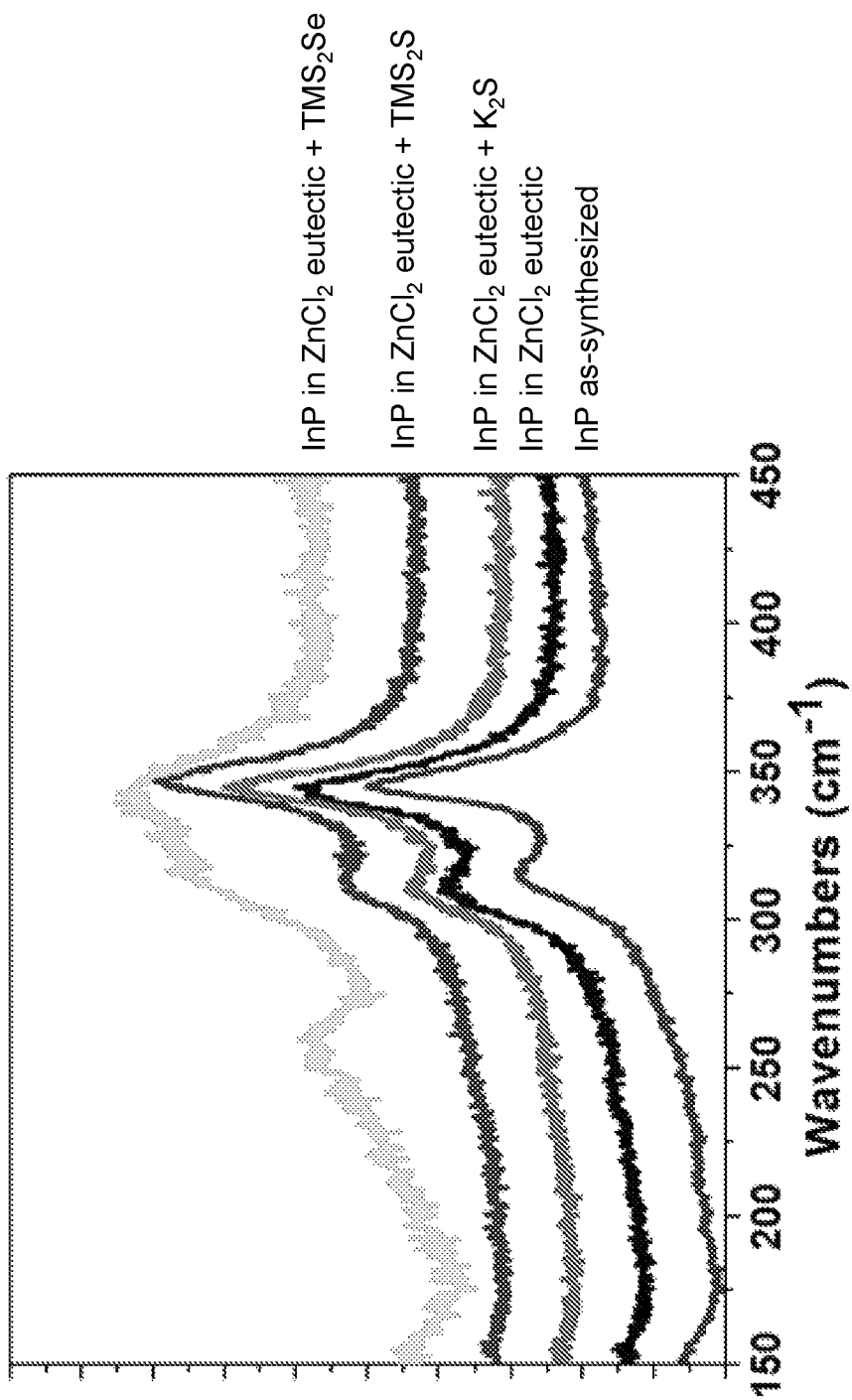
FIG. 9 shows Raman spectra of InP NCs as-synthesized (bottom), InP NCs recovered from a Zn-containing molten inorganic salt (next, moving up), and InP NCs recovered from a Zn-containing molten inorganic salt with added S-containing shell precursor (next two, moving up), and InP NCs recovered from a Zn-containing molten inorganic salt with added Se-containing shell precursor.

FIG. 9 shows the Raman spectra of as-synthesized InP nanocrystals (bottom); InP nanocrystals recovered from ZnCl$_2$—NaCl—KCl (next moving up), InP nanocrystals recovered from ZnCl$_2$—NaCl—KCl with the addition of K$_2$S shell precursor (next moving up), InP nanocrystals recovered from ZnCl$_2$—NaCl—KCl with the addition of TMS$_2$S shell precursor (next moving up), and InP nanocrystals recovered from ZnCl$_2$—NaCl—KCl with the addition of TMS$_2$Se shell precursor (top). There is significant broadening of the TO and LO modes indicative of ZnSe shell growth.

Table 5, below, summarizes the ICP-OES analysis of as-synthesized InP nanocrystals, InP nanocrystals recovered from ZnCl$_2$—NaCl—KCl with the addition of TMS$_2$S shell precursor recovered InP nanocrystals and InP nanocrystals recovered from ZnCl$_2$—NaCl—KCl with the addition of K$_2$S shell precursor. The as-synthesized InP nanocrystals show a slight excess of In as compared to P, but this may be due to excess In-organic capping ligand complexes in the solution. After ZnS growth, the In concentration decreases whereas an appropriate amount of Zn is shown both using K$_2$S and TMS$_2$S as the precursors, providing further evidence of ZnS shell formation.

TABLE 5

ICP-OES of recovered InP nanocrystals.

| Sample | In | P | Zn |
|---|---|---|---|
| InP as-synthesized | 1 | 0.88 | 0 |
| InP/ZnS (TMS$_2$S shell precursor) | 1 | 1.1 | 1.6 |
| InP/ZnS (K$_2$S shell precursor) | 1 | 1.03 | 0.57 |

Example 3

This Example further illustrates the use of the present colloids to conduct chemical transformations using the inorganic nanocrystals contained therein. Specifically, this Example illustrates annealing the inorganic nanocrystals of the colloids to induce modifications of the crystal structure of the nanocrystals.

GaAs nanocrystals were prepared according to the techniques described in Example 1, above. Colloids including the GaAs nanocrystals dispersed in a molten inorganic salt were prepared as described in Example 1, above. Two molten inorganic salts were used: ZnCl$_2$:NaCl:KCl=60:20:20; and CsBr:KBr:LiBr=25:18.9:56.1. In both cases, GaI$_3$ was used as a salt additive, e.g., by adding GaI$_3$ to colloids based on the ZnCl$_2$ eutectic or the CsBr eutectic. The GaI$_3$ additive also provides a source of Ga which serves to alleviate anti-site defects in the GaAs nanocrystals related to excess As. Colloids were annealed by heating them to about 500-550° C. for about one hour. Colloids were analyzed using absorption spectroscopy, X-ray diffraction, Raman spectroscopy and transmission electron microscopy, as described in Example 1, above.

Figure 10:
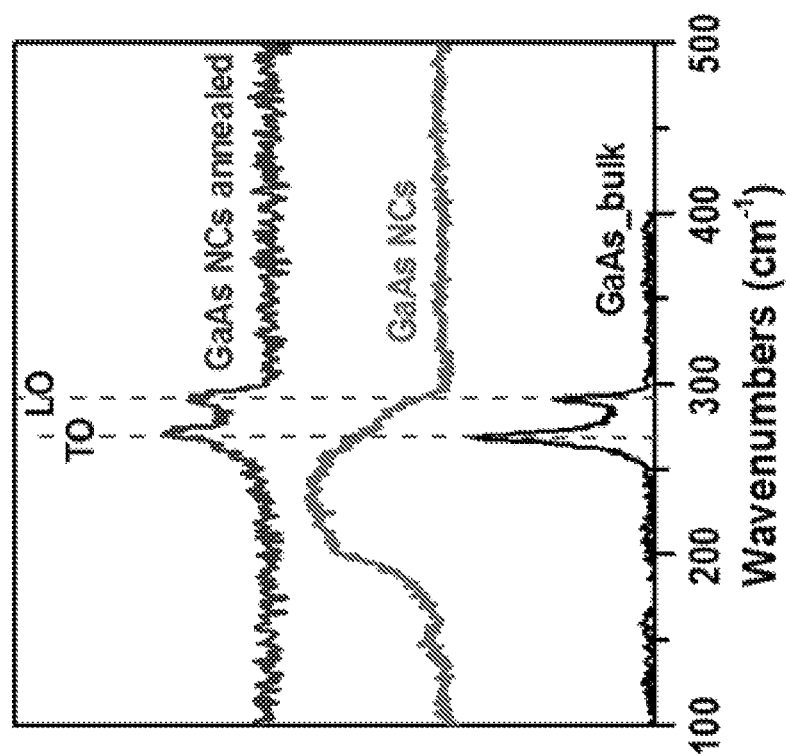
FIG. 10 shows Raman spectra of bulk GaAs (bottom), as-synthesized GaAs nanocrystals (middle) and GaAs nanocrystals annealed in a molten inorganic salt.
Figure 11:
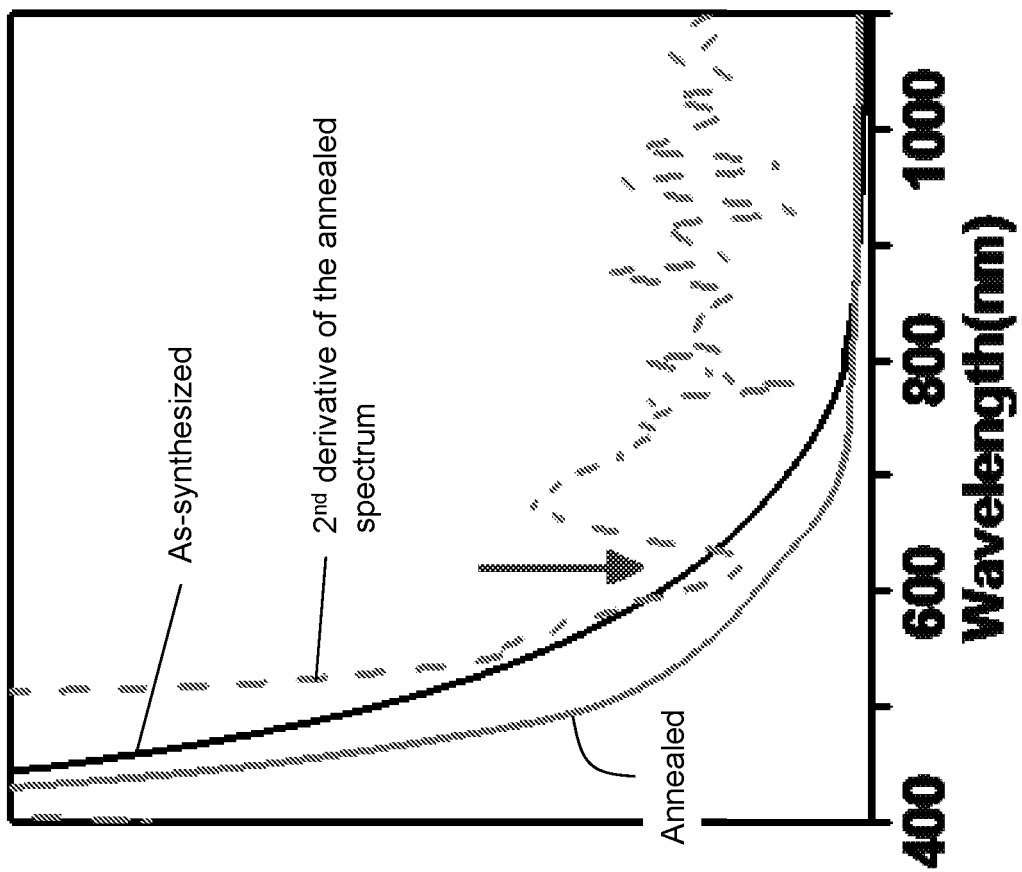
FIG. 11 shows the absorption spectra of GaAs nanocrystals before (as-synthesized) and after annealing in molten inorganic salt (CsBr:KBr:LiBr eutectic with GaI$_3$ additive). The dotted line is the 2$^{nd}$ derivative of the absorption spectrum for the GaAs nanocrystals after annealing.

The results showed that GaAs nanocrystals could be annealed without sintering the nanoparticles and without significantly affecting the morphology of the nanocrystals. However, annealing resulted in a significant removal of structural defects in the GaAs nanocrystals. For example, FIG. 10 shows the Raman spectra of bulk GaAs (bottom), as-synthesized GaAs nanocrystals (middle) and GaAs nanocrystals after annealing in the CsBr eutectic. The as-synthesized GaAs nanocrystals show a broad feature similar to amorphous GaAs due to the presence of significant lattice disorder. However, upon annealing in the CsBr eutectic with GaI$_3$ additive, the characteristic TO and LO phonon modes of GaAs were evident. These features match well with those for bulk GaAs. In addition, the optical properties of the GaAs nanocrystals were improved upon the addition of GaI$_3$ and annealing in the molten inorganic salt. Specifically, as shown in FIG. 11, previously unseen discrete excitonic transitions in quantum confined GaAs nanocrystals were observed. The dotted line shows the 2$^{nd}$ derivative of the absorption spectrum for the annealed GaAs nanocrystals.

Example 4

This Example further illustrates the use of the present colloids to conduct chemical transformations using the inorganic nanocrystals contained therein. Specifically, this Example illustrates inducing cation exchange in the inorganic nanocrystals of the colloids to alter the chemical composition of the nanocrystals.

Figure 12:
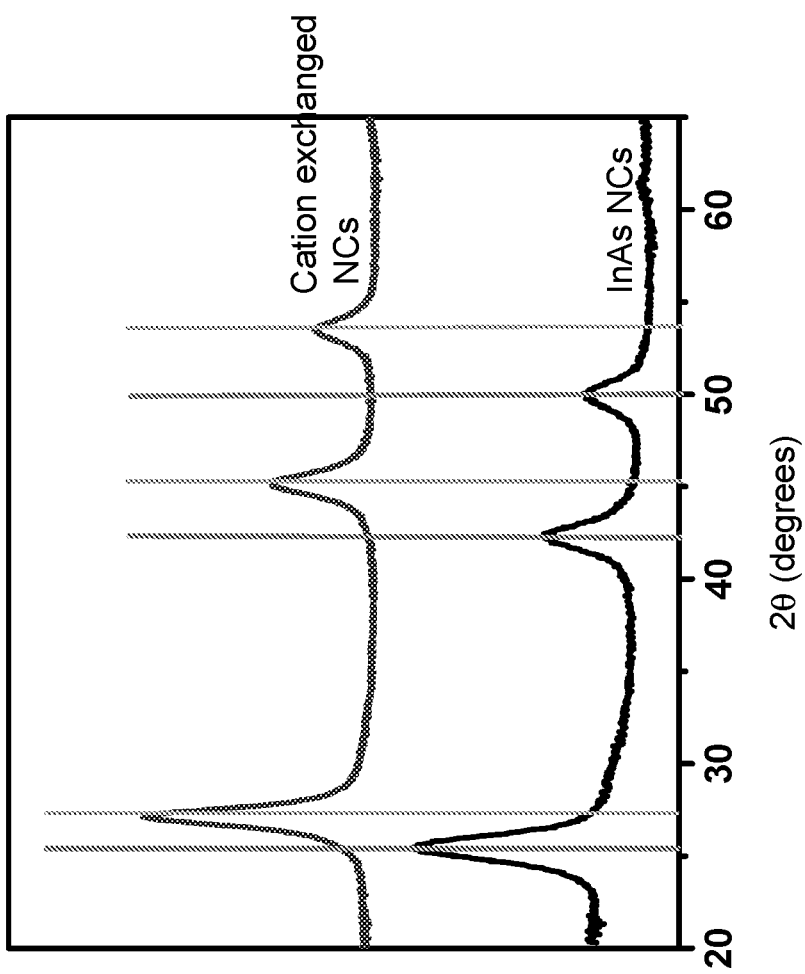
FIG. 12 shows the X-ray diffraction patterns of as-synthesized InAs nanocrystals (bottom) and after cation exchange using molten inorganic salt (CsBr:KBr:LiBr eutectic with GaI$_3$ additive) to transform the nanocrystals to GaAs nanocrystals (top).

InAs nanocrystals were prepared according to the techniques described in Example 1. The InAs nanocrystals were colloidally stabilized in a molten inorganic salt (a CsBr:KBr:LiBr eutectic, T$_m$=236° C.) at 250° C. GaI$_3$ was added to the colloid as a salt additive and the colloid was stirred for two hours at 250° C. The GaI$_3$ also acts as a cation exchange additive by providing a source of ions (Ga) for the cation exchange. The colloid was further heated at 500° C. for one hour. The nanocrystals were recovered from the molten inorganic salt and analyzed using powder X-ray diffraction. As shown in the X-ray diffraction patterns of FIG. 12, the cation exchange of In$^{3+}$ of the inorganic nanocrystals with Ga$^{3+}$ of the cation exchange additive resulted in the transformation of the InAs nanocrystals to GaAs nanocrystals.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A colloid comprising inorganic nanocrystals dispersed in a molten metal salt comprising an ion which is a Lewis acid or a Lewis base in the presence of the inorganic nanocrystals, wherein the molten metal salt does not comprise a nitrate salt or a nitrite salt or a combination thereof.

2. The colloid of claim 1, wherein the molten metal salt has a melting point of below 350° C.

3. The colloid of claim 1, wherein the molten metal salt is a metal halide; a mixture of metal halides and optionally, an amount of a salt additive; or a mixture of metal thiocyanates and optionally, an amount of a salt additive.

4. The colloid of claim 1, wherein the nanocrystals are metal nanocrystals, metal alloy nanocrystals, semiconductor nanocrystals, metal oxide nanocrystals, metalloid oxide nanocrystals, or a combination thereof.

5. The colloid of claim 1, wherein the colloid is substantially free of organic capping ligands.

6. The colloid of claim 1, wherein the nanocrystals comprise no more than about 10 weight % of the colloid.

7. The colloid of claim 1, wherein the molten metal salt is selected from the group consisting of: a mixture of $AlCl_3$, NaCl, and KCl; a mixture of $LiAlBr_4$, $NaAlCl_4$, $KAlCl_4$ and an amount of $AlBr_3$ as a salt additive; a mixture of $NaAlCl_4$ and $KAlCl_4$ and an amount of $AlrBr_3$ or $AlCl_3$ as a salt additive; $AlBr_3$; a mixture of LiCl, LiBr, and KBr; a mixture of LiCl, LiI, and KI; a mixture of CsBr, LiBr, and KBr and optionally, an amount of $GaI_3$ as a salt additive; a mixture of $ZnCl_2$, NaCl, and KCl and optionally, an amount of $GaI_3$ as a salt additive; a mixture of KSCN and NaSCN; and $GaI_3$.

8. A method comprising heating the colloid of claim 1 to a temperature and for a time sufficient to induce a chemical transformation of the inorganic nanocrystals.

9. The method of claim 8, wherein the temperature is at least about 300° C.

10. The method of claim 8, further comprising adding a shell precursor to the colloid, wherein the temperature and the time are sufficient to form a shell over the inorganic nanocrystals, thereby providing core-shell nanocrystals.

11. The method of claim 10, wherein the molten metal salt is selected to provide a first component of the shell and the shell precursor is selected to provide a second component of the shell.

12. The method of claim 8, wherein the temperature and the time are sufficient to at least partially remove defects in the crystal structure of the inorganic nanocrystals.

13. The method of claim 8, further comprising adding an ion exchange additive to the colloid, wherein the temperature and the time are sufficient to induce an exchange of ions of the ion exchange additive with ions of the inorganic nanocrystals, thereby changing the chemical composition of the inorganic nanocrystals.

14. A colloid comprising inorganic nanocrystals dispersed in a molten metal salt comprising an ion which is a Lewis acid or a Lewis base in the presence of the inorganic nanocrystals, wherein the nanocrystals are metal nanocrystals, metal alloy nanocrystals, semiconductor nanocrystals, metal oxide nanocrystals, metalloid oxide nanocrystals, or a combination thereof.

15. The colloid of claim 14, wherein the nanocrystals have an average largest cross-sectional dimension of no greater than 100 nm.

16. The colloid of claim 14, wherein the molten metal salt is a metal halide; a mixture of metal halides and optionally, an amount of a salt additive; or a mixture of metal thiocyanates and optionally, an amount of a salt additive.

17. The colloid of claim 14, wherein the molten metal salt is selected from the group consisting of: a mixture of $AlCl_3$, NaCl, and KCl; a mixture of $LiAlBr_4$, $NaAlCl_4$, $KAlCl_4$ and an amount of $AlBr_3$ as a salt additive; a mixture of $NaAlCl_4$ and $KAlCl_4$ and an amount of $AlrBr_3$ or $AlCl_3$ as a salt additive; $AlBr_3$; a mixture of LiCl, LiBr, and KBr; a mixture of LiCl, LiI, and KI; a mixture of CsBr, LiBr, and KBr and optionally, an amount of $GaI_3$ as a salt additive; a mixture of $ZnCl_2$, NaCl, and KCl and optionally, an amount of $GaI_3$ as a salt additive; a mixture of KSCN and NaSCN; and $GaI_3$.

18. A method comprising heating the colloid of claim 14 to a temperature and for a time sufficient to induce a chemical transformation using the inorganic nanocrystals.

* * * * *

UNITED STATES PATENT AND TRADEMARK OFFICE
CERTIFICATE OF CORRECTION

PATENT NO. : 11,040,323 B2  
APPLICATION NO. : 15/772950  
DATED : June 22, 2021  
INVENTOR(S) : Dmitri V. Talapin et al.

Page 1 of 1

It is certified that error appears in the above-identified patent and that said Letters Patent is hereby corrected as shown below:

In the Claims

Claim 7, Column 23, Line 26:
Delete the phrase "AlrBr$_3$" and replace with --AlBr$_3$--.

Claim 17, Column 24, Line 31:
Delete the phrase "AlrBr$_3$" and replace with --AlBr$_3$--.

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*